United States Patent
Kim et al.

(10) Patent No.: US 10,736,165 B2
(45) Date of Patent: Aug. 4, 2020

(54) METHOD AND APPARATUS FOR LOGGING INFORMATION

(71) Applicant: Samsung Electronics Co., Ltd., Suwon-si, Gyeonggi-do (KR)

(72) Inventors: Sang Bum Kim, Suwon-si (KR); Soeng Hun Kim, Yongin-si (KR); Kyeong In Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 14 days.

(21) Appl. No.: 15/495,189

(22) Filed: Apr. 24, 2017

(65) Prior Publication Data

US 2017/0231028 A1 Aug. 10, 2017

Related U.S. Application Data

(63) Continuation of application No. 14/360,822, filed as application No. PCT/KR2013/000188 on Jan. 9, 2013, now Pat. No. 9,647,914.

(Continued)

(51) Int. Cl.
*H04W 76/18* (2018.01)
*H04W 4/029* (2018.01)
(Continued)

(52) U.S. Cl.
CPC ......... *H04W 76/18* (2018.02); *H04L 43/0847* (2013.01); *H04W 4/02* (2013.01);
(Continued)

(58) Field of Classification Search
CPC .. H04L 43/0847; H04W 24/00; H04W 24/08; H04W 24/10; H04W 74/0833; H04W 76/027
See application file for complete search history.

(56) References Cited

U.S. PATENT DOCUMENTS

| 5,898,681 A | 4/1999 | Dutta |
| 6,370,390 B1 | 4/2002 | Salin et al. |

(Continued)

FOREIGN PATENT DOCUMENTS

| CN | 1229562 A | 9/1999 |
| CN | 1524392 A | 8/2004 |

(Continued)

OTHER PUBLICATIONS

Study on Minimization of Drive-Tests in Next Generation Networks, 3GPP TR 36.805, Dec. 31, 2009, pp. 1-5, V9.0.0.

(Continued)

*Primary Examiner* — Un C Cho
*Assistant Examiner* — Peter K Mak
(74) *Attorney, Agent, or Firm* — Jefferson IP Law, LLP

(57) ABSTRACT

The present invention relates to a method and an apparatus for logging a radio resource control (RRC) failure of user equipment (UE) and receiving the log. According to one embodiment of the present invention, a method for logging an RRC failure of UE may comprise the steps of: attempting random access; if the failure of random access is sensed, logging information on the failure; and if the success of random access is sensed, transmitting information on the failure logged before the success to a connected base station. According to one embodiment of the present invention, an apparatus and a method which effectively log a channel state or a connection failure can be provided.

10 Claims, 14 Drawing Sheets

Related U.S. Application Data

(60) Provisional application No. 61/592,568, filed on Jan. 30, 2012, provisional application No. 61/595,646, filed on Feb. 6, 2012, provisional application No. 61/649,910, filed on May 21, 2012, provisional application No. 61/584,744, filed on Jan. 9, 2012.

(51) Int. Cl.
- H04W 52/22 (2009.01)
- H04W 4/02 (2018.01)
- H04L 12/26 (2006.01)
- H04W 24/10 (2009.01)
- H04W 74/08 (2009.01)

(52) U.S. Cl.
CPC .......... *H04W 4/029* (2018.02); *H04W 24/10* (2013.01); *H04W 52/228* (2013.01); *H04W 74/0833* (2013.01); *Y02D 70/124* (2018.01); *Y02D 70/126* (2018.01); *Y02D 70/14* (2018.01)

(56) References Cited

U.S. PATENT DOCUMENTS

| | | |
|---|---|---|
| 8,638,705 B2 | 1/2014 | Park et al. |
| 8,649,288 B2 | 2/2014 | He et al. |
| 8,743,896 B2 | 6/2014 | Wu |
| 8,792,417 B2 | 7/2014 | Yeoum et al. |
| 9,237,419 B2 | 1/2016 | Jung et al. |
| 9,668,177 B2 | 5/2017 | Grob-Lipski et al. |
| 2003/0223452 A1* | 12/2003 | Toskala ............... H04W 52/50 370/442 |
| 2004/0147274 A1 | 7/2004 | Khawand et al. |
| 2004/0180675 A1 | 9/2004 | Choi et al. |
| 2004/0203775 A1 | 10/2004 | Bourdeaut et al. |
| 2005/0041608 A1 | 2/2005 | Jeong et al. |
| 2005/0111393 A1 | 5/2005 | Jeong et al. |
| 2006/0023664 A1 | 2/2006 | Jeong et al. |
| 2006/0058034 A1 | 3/2006 | Vaittinen et al. |
| 2007/0019643 A1 | 1/2007 | Shaheen |
| 2007/0032251 A1 | 2/2007 | Shaheen |
| 2007/0287419 A1 | 12/2007 | Wang |
| 2008/0273610 A1 | 11/2008 | Malladi et al. |
| 2009/0016266 A1* | 1/2009 | Kim ................ H04W 74/002 370/328 |
| 2009/0034452 A1 | 2/2009 | Somasundaram et al. |
| 2009/0170498 A1 | 7/2009 | Venkatasubramanian et al. |
| 2009/0232118 A1 | 9/2009 | Wang et al. |
| 2009/0238098 A1 | 9/2009 | Cai et al. |
| 2009/0239525 A1 | 9/2009 | Cai et al. |
| 2009/0247176 A1 | 10/2009 | Song et al. |
| 2009/0316586 A1 | 12/2009 | Yi et al. |
| 2009/0323608 A1 | 12/2009 | Adachi et al. |
| 2010/0075635 A1 | 3/2010 | Lim et al. |
| 2010/0093386 A1 | 4/2010 | Damnjanovic et al. |
| 2010/0118805 A1 | 5/2010 | Ishii et al. |
| 2010/0144361 A1 | 6/2010 | Gholmieh et al. |
| 2010/0172280 A1 | 7/2010 | Guo et al. |
| 2010/0177831 A1 | 7/2010 | Kim et al. |
| 2010/0195524 A1 | 8/2010 | Iwamura et al. |
| 2010/0195643 A1 | 8/2010 | Kodali et al. |
| 2010/0210255 A1* | 8/2010 | Amirijoo ............ H04W 74/002 455/419 |
| 2010/0246491 A1 | 9/2010 | Bae et al. |
| 2010/0255847 A1* | 10/2010 | Lee ................ H04W 52/50 455/436 |
| 2010/0265873 A1 | 10/2010 | Yi et al. |
| 2010/0278131 A1 | 11/2010 | Jeong et al. |
| 2010/0296467 A1 | 11/2010 | Pelletier et al. |
| 2010/0317356 A1 | 12/2010 | Roessel et al. |
| 2010/0322217 A1 | 12/2010 | Jin et al. |
| 2011/0003603 A1 | 1/2011 | Park et al. |
| 2011/0021197 A1 | 1/2011 | Ngai |
| 2011/0038277 A1 | 2/2011 | Hu et al. |
| 2011/0051609 A1 | 3/2011 | Ishii et al. |
| 2011/0075636 A1 | 3/2011 | Blomgren et al. |
| 2011/0085535 A1 | 4/2011 | Shaheen |
| 2011/0103328 A1 | 5/2011 | Lee et al. |
| 2011/0116433 A1 | 5/2011 | Dorenbosch |
| 2011/0134774 A1 | 6/2011 | Pelletier et al. |
| 2011/0158165 A1 | 6/2011 | Dwyer et al. |
| 2011/0170503 A1 | 7/2011 | Chun et al. |
| 2011/0188416 A1 | 8/2011 | Faccin et al. |
| 2011/0194505 A1 | 8/2011 | Faccin et al. |
| 2011/0195668 A1 | 8/2011 | Lee et al. |
| 2011/0201307 A1 | 8/2011 | Segura |
| 2011/0249641 A1 | 10/2011 | Kwon et al. |
| 2011/0299415 A1 | 12/2011 | He et al. |
| 2012/0020231 A1 | 1/2012 | Chen et al. |
| 2012/0044847 A1 | 2/2012 | Chang |
| 2012/0044898 A1 | 2/2012 | Ishii |
| 2012/0051297 A1 | 3/2012 | Lee et al. |
| 2012/0088457 A1* | 4/2012 | Johansson .......... H04W 24/10 455/67.11 |
| 2012/0108199 A1 | 5/2012 | Wang et al. |
| 2012/0113915 A1* | 5/2012 | Chen .................. H04W 52/365 370/329 |
| 2012/0176950 A1 | 7/2012 | Zhang et al. |
| 2012/0202487 A1 | 8/2012 | Kazmi et al. |
| 2012/0236776 A1 | 9/2012 | Zhang et al. |
| 2012/0276913 A1 | 11/2012 | Lim et al. |
| 2013/0039250 A1 | 2/2013 | Hsu |
| 2013/0070682 A1 | 3/2013 | Kim et al. |
| 2013/0265866 A1 | 10/2013 | Yi et al. |
| 2014/0023032 A1 | 1/2014 | Kim et al. |
| 2014/0233516 A1* | 8/2014 | Chun .................. H04W 24/08 370/329 |
| 2014/0242974 A1 | 8/2014 | Lee et al. |
| 2015/0103771 A1 | 4/2015 | Kim et al. |
| 2017/0195020 A1 | 7/2017 | Ko et al. |

FOREIGN PATENT DOCUMENTS

| | | |
|---|---|---|
| CN | 1671240 A | 9/2005 |
| CN | 1738486 A | 2/2006 |
| CN | 1829380 A | 9/2006 |
| CN | 101242608 A | 8/2008 |
| CN | 101668250 A | 3/2010 |
| CN | 101682896 A | 3/2010 |
| CN | 101772928 A | 7/2010 |
| CN | 101841889 A | 9/2010 |
| CN | 101848506 A | 9/2010 |
| CN | 10198661 A | 3/2011 |
| CN | 102027798 A | 4/2011 |
| CN | 102098655 A | 6/2011 |
| CN | 102150454 A | 8/2011 |
| CN | 102170644 A | 8/2011 |
| EP | 0 946 071 A2 | 9/1999 |
| EP | 2 230 872 A1 | 9/2010 |
| EP | 2 265 077 A1 | 12/2010 |
| EP | 2 410 670 A2 | 1/2012 |
| EP | 2 469 939 A1 | 6/2012 |
| EP | 2 849 369 A1 | 3/2015 |
| EP | 2 849 501 A1 | 3/2015 |
| GB | 2461780 A | 1/2010 |
| KR | 10-2005-0015729 A | 2/2005 |
| KR | 10-2005-0032953 A | 4/2005 |
| KR | 10-2009-0019868 A | 2/2009 |
| KR | 10-2010-0017513 A | 2/2010 |
| KR | 10-2010-0034885 A | 4/2010 |
| KR | 10-2010-0051906 A | 5/2010 |
| KR | 10-2010-0105449 A | 9/2010 |
| KR | 10-2010-0106890 A | 10/2010 |
| KR | 10-2010-0122565 A | 11/2010 |
| KR | 10-2010-0126509 A | 12/2010 |
| KR | 10-2010-0133477 A | 12/2010 |
| KR | 10-2010-0135679 A | 12/2010 |
| KR | 10-2010-0137531 A | 12/2010 |
| KR | 10-2010-0139098 A | 12/2010 |
| KR | 10-2011-0000479 A | 1/2011 |
| KR | 10-2011-0000482 A | 1/2011 |
| KR | 10-2011-0010100 A | 1/2011 |
| KR | 10-2011-0049622 A | 5/2011 |

(56) References Cited

FOREIGN PATENT DOCUMENTS

| | | |
|---|---|---|
| KR | 10-2011-0088446 A | 8/2011 |
| KR | 10-2011-0091305 A | 8/2011 |
| KR | 10-2011-0093642 A | 8/2011 |
| KR | 10-2011-0109992 A | 10/2011 |
| KR | 10-2011-0122617 A | 11/2011 |
| KR | 10-2012-0034159 A | 4/2012 |
| RU | 2262811 C2 | 4/2005 |
| RU | 2 426 251 C2 | 8/2011 |
| WO | 2008/024788 A2 | 2/2008 |
| WO | 2008/137354 A1 | 11/2008 |
| WO | 2009/132290 A2 | 10/2009 |
| WO | 2011/038625 A1 | 8/2010 |
| WO | 2010-124228 A2 | 10/2010 |
| WO | 2010/125969 A1 | 11/2010 |
| WO | 2011/038272 A1 | 3/2011 |
| WO | 2011/085802 A1 | 7/2011 |
| WO | 2011/093666 A2 | 8/2011 |
| WO | 2011/099725 A2 | 8/2011 |
| WO | 2011/100492 A1 | 8/2011 |
| WO | 2011/133934 A1 | 10/2011 |
| WO | 2011-154761 A1 | 12/2011 |
| WO | 2011/155784 A2 | 12/2011 |
| WO | 2011/157292 A1 | 12/2011 |
| WO | 2012/008691 A2 | 1/2012 |
| WO | 2012/108811 A1 | 8/2012 |
| WO | 2012-141483 A2 | 10/2012 |
| WO | 2013-051836 A1 | 4/2013 |
| WO | 2013-051912 A2 | 4/2013 |
| WO | 2013/065995 A1 | 5/2013 |

OTHER PUBLICATIONS

3rd Generation Partership Project; Technical Specification Group Radio Access Network; Study on Minimization of drive-tests in Next Generation Networks; 3GPP TR 36.805 V9.0.0, (Release 9); Dec. 2009; pp. 1-24.
"23.1 RRC Connection Establishment"; WayBack Machine; www.lte-bullets.com; pp. 1-4; Aug. 12, 2011.
Huawei et al, The MDT applicability of EPLMN, 3GPP Draft, R2-114011, Aug. 16, 2011, Athens, Greece, XP050539793.
Ericsson et al, Accessibility measurements for MDT, 3GPP Draft, R2-116148, Nov. 8, 2011, San Francisco, CA, XP050564463.
3rd Generation Partnership Project, Technical Specification Group Radio Access Network, Universal Terrestrial Radio Access (UTRA) and Evolved Universal Terrestrial Radio Access (E-UTRA), Radio measurement collection for Minimization of Drive Tests (MDT), Overall description, Stage 2 (Release 10), 3GPP Draft TS 37.320 v10.4.0, Dec. 22, 2011, Sophia Antipolis, France, XP050915216.
3rd Generation Partnership Project; Technical Specification Group Radio Access Network; Evolved Universal Terrestrial Radio Access (E-UTRA); User Equipment (UE) radio transmission and reception (Release 10); Jun. 2011; pp. 1-237; 3GPP TS 36.101; V10.3.0.
Asustek; Issues of Random Access procedure on SCell; R2-112922; May 2011; pp. 1-4; 3GPP TSG-RAN WG2 Meeting #74; Barcelona, Spain.
InterDigital; RACH with Carrier Aggregation; R2-102132; Apr. 2010; pp. 1-3; 3GPP TSG-RAN WG2 #69bis; Beijing, China.
3rd Generation Partnership Project; Technical Specification Group Radio Access Network; Evolved Universal Terrestrial Radio Access (E-UTRA); Medium Access Control (MAC) protocol specification (Release 11); Sep. 2012; pp. 1-55; 3GPP TS 36.321; V11.0.0.
Pantech; IDC trigger procedure; R2-120664; Nov. 2011; pp. 1-5; 3GPP TSG-RAN WG2 Meeting #77; Dresden, Germany.
Ericsson; Multiple frequency band indicators per cell; R2-114299; Aug. 2011; pp. 1-5; 3GPP TSG-RAN WG2 #75; Athens, Greece.
Ericsson; Multiple frequency band indicators per cell; R2-114301; Aug. 2011; pp. 1-8; 3GPP TSG-RAN2 Meeting #75; Athens, Greece.
InterDigital Communications, "Handling of SCell Activation/ Deactivation RF Retuning Interruptions", 3GPP TSG RAN WG2 #78 R2-122289; May 14, 2012; pp. 1-13.
Renesas Mobile Europe Ltd, "Considerations on retuning interruptions", 3GPP TSG-RAN WG4 Meeting #63 R4-123056; May 14, 2012; pp. 1-5.
Samsung, "RRC TP on CA changes regarding Connection control", 3GPP, Jun. 28-Jul. 2, 2010, TSG-RAN2#70 bis meeting, R2-103802, pp. 1-19, Stockholm, Sweden.
ZTE, 3GPP TSG-RAN WG2 Meeting #74 R2-113388, pp. 1-9, Barcelona, Spain.
Huawei Hisilicon, "Enabling SMS for PS-only", Oct. 10-14, 2011, SA WG2 Meeting #87 S2-114586, pp. 1-4, Jeju, Korea.
Alcatel-Lucent, "VLR SGs paging retry", 3GPP,Oct. 10-14, 2011, SA WG2 Meeting #87 S2-114636, pp. 1-4, Jeju, South Korea.
Pantech, "IDC trigger procedure", 3GPP, Nov. 14-18, 2011, pp. 1-5, TSG-RAN WG2 Meeting #77 R2-120664, Dresden, Germany.
Motorola, "Solution for Extra low power consumption & time controlled", 3GPP, Feb. 22-26, 2010, pp. 1-3, TSG SA WG2 Meeting #78 TD S2-101215, San Francisco CA. USA.
Huawei Hisilicon, "General Consideration of EAB in LTE", 3GPP, Aug. 22-26, 2011, WG2 Meeting #75 R2-113988, pp. 1-3, Athens, Greece.
Alcatel-Lucent, "RA Procedure on SCell", 3GPP, Feb. 6-10, 2012, pp. 1-5, SA WG2 Meeting #77 R2-120603, Dresden, Germany.
3rd Generation Partership Project, "Technical Specification Group Services ans Systems Aspects, Service Accessibility", 3GPP, Dec. 2011, pp. 1-26, TS 22.011 v11.2.0.
3rd Generation Partership Project, "Technical Specification Group Services and System Aspects; Circuit Switched (CS) fallback in Evolved Packet System (EPS); Stage 2", 3GPP, Sep. 2011, pp. 1-79, TS 23.272 V10.5.0.
Samsung; "Discussion on CQI/SRS transmission during DRX"; 3GPP TSG-RAN2 #75 Meeting; Aug. 22-26, 2011; pp. 1-5; Athens, Greece; R2-114180.
ZTE; "Consideration on SCell RLM in Carrier Aggregation"; 3GPP TSG-RAN WG4 Meeting AH#4; Oct. 11-15, 2010; pp. 1-3; Xi'an, China; R4-103527.
3GPP; "Evolved Universal Terrestrial Radio Access (E-UTRA); Medium Access Control (MAC) protocol specification (Release 10)"; 3GPP TS 36.321 V10.0.0; Dec. 2010; pp. 1-53.
Samsung; "PS-only high level function description"; 3GPP TSG SA WG2 Meeting #89; Feb. 6-10, 2012; pp. 1-3; Vancouver, Canada; S2-110485.
European Office Action dated Jul. 24, 2018, issued in connection with counterpart European application No. 12839782.5-1214.
Korean Office Action dated Aug. 31, 2018, issued in connection with counterpart Korean application No. 10-2012-0035228.
Korean Office Action dated Sep. 13, 2018, issued in connection with counterpart Korean application No. 10-2012-0140229.
Research in Motion Ltd; "Go to Long Sleep Command for LTE DRX"; 3GPP TSG-RAN-WG2 Meeting #61bis; Mar. 31, 2008-Apr. 4, 2008; Shenzhen, China; R2-081868.
3GPP; 3rd Generation Partnership Project; Technical Specification Group Radio Access Network; Evolved Universal Terrestrial Radio Access (E-UTRA); Medium Access Control (MAC) Protocol Specification (Release 10); Jun. 2011; 3GPP TS 36.321; V10.2.0 (Jun. 2011).
Ericsson et al.; "SMS Over SGs Usage to Support NAS Procedures for PS Only SMS"; SA WG2 Meeting #89; Feb. 6-10, 2011; Vancouver, Canada; S2-121108.
Huawei et al.; Enabling SMS for PS-only; SA WG2 Meeting #87; Oct. 10-14, 2011; Jeju, Korea; S2-114186.
Huawei et al.; "Support for Enhanced UE Battery Saving"; SA WG2 Meeting #89; Feb. 6-10, 2012; Vancouver, Canada; S2-120715.
3GPP; 3rd Generation Partnership Project; Technical Specification Group Radio Access Network; Evolved Universal Terrestrial Radio Access (E-UTRA); Radio Resource Control (RRC) Protocol Specification (Release 10); Dec. 2011; 3GPP TS 36.331; V10.4.0 (Dec. 2011).
European Patent Office; Extended Search Report; dated Nov. 19, 2018; Application No. 18186199.8-1218.
Government of India; Examination Report; dated Nov. 27, 2018; Application No. 2015/19/KOLNP/2014; India.
Japanese Patent Office; Notice of Reasons for Refusal; dated Dec. 17, 2018; Application No. 2018-073713; Japan.

(56) References Cited

OTHER PUBLICATIONS

Korean Intellectual Property Office; Korean Office Action; dated Jan. 3, 2019; Application No. 10-2013-0002455; Korea.
Korean Intellectual Property Office; Korean Office Action; dated Jan. 3, 2019; Application No. 10-2013-0002595; Korea.
Korean Intellectual Property Office; Korean Office Action; dated Dec. 15, 2018; Application No. 10-2014-7028047; Korea.
Korean Intellectual Property Office; Korean Office Action; dated Dec. 20, 2018; Application No. 10-2013-0012964; Korea.
Korean Office Action dated Mar. 14, 2019, issued in Korean Application No. 10-2012-0140229.
Korean Office Action dated Mar. 13, 2019, issued in Korean Application No. 10-2013-0004568.
Korean Office Action dated Mar. 18, 2019, issued in Korean Application No. 10-2012-0087760.
Korean Office Action dated Mar. 6, 2019, issued in Korean Application No. 10-2013-0050776.
Korean Office Action dated Jan. 21, 2019, issued in Korean Application No. 10-2014-7027400.
LG Electronics Inc., R2-114456, EAB model in UE, 3GPP TSG RAN WG2 #75, 3GPP, Athens, Greece Aug. 16, 2011.
Ericsson et al., "Registration of MME for SMS", 3GPP SA WG2 Meeting #93, Oct. 12, 2012. S2-124181, Sofia, Bulgaria, Oct. 12, 2012.
Intel Corporation, R2-113215, Configuration of multiple TA in Rel-11 CA, 3GPP TSG RAN WG2 #74, 3GPP, Barcelona, Spain, May 3, 2011.
InterDigital Communications, R2-113255, Support for multiple Timing Advance in LTE CA, 3GPP TSG RAN WG2 #74, 3GPP, Barcelona, Spain, May 3, 2011.
Huawei et al., R2-113285, Discussion on TA group management, 3GPP TSG RAN WG2 #74, 3GPP, Barcelona, Spain, May 3, 2011.
NTT DoCoMo; Further discussions on LTE-A UE categories/ capabilities; 3GPP TSG-RAN WG4 Ad-hoc meeting #Apr. 2010; R4-103470; Oct. 15, 2010; Xi'an, China.
3GPP; 3rd Generation Partnership Project; Technical Specification Group Radio Access Network; Evolved Universal Terrestrial Radio Access (E-UTRA); Radio Resource Control (RRC); Protocol specification (Release 10); 3GPP TS 36.331; V10.5.0; Mar. 2012; Valbonne, France.
Samsung; On the reporting the failed RRC connection establishment; 3GPP TSG RAN WG2 #77bis R2-121272 Mar. 26-30, 2012; Jeju Island, Korea.
Korean Office Action with English translation dated Apr. 10, 2019; Korean Appln. No. 10-2012-0112390.
Korean Office Action with English translation dated May 1, 2019; Korean Appln. No. 10-2013-0051929.
Korean Office Action with English translation dated May 2, 2019; Korean Appln. No. 10-2019-7009763.
Korean Office Action with English translation dated May 29, 2019; Korean Appln. No. 10-2014-7035538.
Canadian Office Action dated Jun. 6, 2019; Candian Appln. No. 2,859,499.
Nokia Siemens Networks et al.; Clarification on CQI/SRS reporting during DRX; 3GPP TSG-RAN WG2 Meeting #75; R2-114021; Aug. 22-26, 2011; Athens, Greece.
Ericsson et al.; CSI and SRS reporting at unexpected DRX state change; 3GPP TSG-RAN WG2 #75; Tdoc R2-114033; Aug. 22-26, 2011; Athens, Greece.
Huawei et al.; Consideration on coverage optimization; 3GPP TSG-RAN WG2 Meeting #76; R2-115885; Nov. 14-18, 2011; San Francisco, CA.
European Search Report dated Jul. 3, 2019; European Appln. No. 19165270.0-1218.
Korean Office Action with English translation dated Sep. 4, 2019; Korean Appln. No. 10-2012-0113330.
Korean Decision with English translation dated Sep. 5, 2019; Korean Appln. No. 10-2013-0002595.
Korean Decision with English translation dated Sep. 18, 2019; Korean Appln. No. 10-2013-0004568.

Indian Office Action dated Sep. 18, 2019; Indian Appln. No. 3851/KOLNP/2013.
Huawei et al.; Signalling for the TA Group Management; 3GPP TSG-RAN WG2 Meeting #76; R2-115827; Nov. 14-18, 2011; San Francisco, CA.
Catt et al.; Frame and SFN timing in CA; 3GPP TSG RAN WG2 Meeting #70bis; R2-103521; Jun. 28-Jul. 2, 2010; Stockholm, Sweden.
Research in Motion UK Limited; Interference measurement for BT; 3GPP TSG-RAN WG2 Meeting #77; R2-120183; Feb. 6-10, 2012; Dresden, Germany.
Ericsson et al.; Introduction of relays in MAC; 3GPP TSG-RAN WG2 Meeting #71; R2-105210; Aug. 23-27, 2010; Madrid, Spain.
Texas Instruments; Increasing Sounding Capacity for LTE-A; 3GPP TSG RAN WG1 #59bis; R1-100745; Jan. 18-22, 2010; Valencia, Spain.
European Search Report dated Oct. 7, 2019; European Appln. No. 19184016.4-1218.
Indian Office Action dated Oct. 14, 2019; Indian Appln. No. 2870/KOLNP/2013.
Korean Office Action with English translation dated Oct. 23, 2019; Korean Appln. No. 10-2012-0087760.
European Search Report dated Oct. 24, 2019; European Appln. No. 19179723.2-1218.
3GPP; 3rd Generation Partnership Project; Technical Specification Group Radio Access Network; Evolved Universal Terrestrial Radio Access (E-UTRA); Medium Access Control (MAC) protocol specification (Release 10); 3GPP TS 36.321; V10.4.0; Dec. 2011; Valbonne, France.
Korean Office Action with English translation dated Nov. 28, 2019; Korean Appln. No. 10-2013-0006771.
Chinese Office Action with English translation dated Nov. 20, 2019; Chinese Appln. No. 201710940663.5.
Samsung; PS-only high level function description; 3GPP TSG SA WG2 Meeting #89; TD S2-120485; Feb. 6-10, 2012; Vancouver, Canada.
Korean Office Action with English translation dated Dec. 19, 2019; Korean Appln. No. 10-2012-0140229.
Alcatel-Lucent; Report of Email discussion on [68b#21] LTS: 36.331 CR for "full configuration"; 3GPP TSG RAN WG2 #69; R2-101376; Feb. 22-26, 2010; San Francisco, CA.
Nokia Siemens Networks el al.; PDCP SN extension in Rel-11; 3GPP TSG-RAN WG2 Meeting #79; R2-123432; Aug. 13-17, 2012; Qingdao, CN.
Rapporteur (Ericsson); UE soft buffer handling in MAC; 3GPP TSG-RAN2 WG2 Meeting #75bis; R2-115078; Oct. 10-14, 2011; Zhuhai, CN.
Korean Office Action with English translation dated Feb. 4, 2020; Korean Appln. No. 10-2014-7031585.
Korean Office Action with English translation dated Feb. 5, 2020; Korean Appln. No. 10-2019-0169542.
Korean Office Action with English translation dated Feb. 26, 2020; Korean Appln. No. 10-2012-0113330.
Korean Decision of Patent with English translation dated Feb. 26, 2020; Korean Appln. No. 10-2012-0087076.
European Search Report dated Feb. 7,2020; European Appln. No. 19206062.2-1218.
Huawei et al.; EAB parameters in shared network; 3GPP TSG-RAN WG2 Meeting #76; R2-115830; Nov. 14-18, 2011; San Francisco, CA.
Mediatek; Further details on EAB; 3GPP TSG-RAN2 #76 Meeting; R2-116094; Nov. 14-18, 2011; San Francisco, CA.
Zte et al; Clarification on how EAB is applied in Shared Network; 3GPP TSG-SA WG1 Meeting #54; S1-111310; May 9-13, 2011; Xi'an, China
3GPP; 3rd Generation Partnership Project; Technical Specification Group Radio Access Network; Evolved Universal Terrestrial Radio Access (E-UTRA); Medium Access Control (MAC) protocol specification (Release 10); 3GPP TS 36.321; V10.1.0; Mar. 2011; Valbonne, France.
Ericsson; Details of MAC DRX Control; TSG-RAN WG2 Meeting #61; R2-080934; Feb. 11-15, 2008; Sorento, Italy.

(56) References Cited

OTHER PUBLICATIONS

Nokia Corporation et al.; RACH and carrier aggregation; 3GPP TSG-RAN WG2 Meeting #68; R2-096844; Nov. 9-13, 2009; Jeju, South Korea.

ITRI; Considerations on Random Access on SCell; 3GPP TSG RAN WG2 #74; R2-113192; May 9-13, 2011; Barcelona, Spain.

New Postcom; Consideration on RA response window size for SCell; 3GPP TSG RAN WG2 Meeting #79; R2-123485; Aug. 13-17, 2012; Qingdao, China.

Qualcomm Incorporated; Assistance Information for MBMS UEs in RRC_IDLE mode; 3GPP TSG-RAN WG2 #75bis; R2-115104; Oct. 10-14, 2011; Zhuhai, China.

Huawei et al.; How does the UE determine whether neighbour cells of MBMS frequency can provide the service(s) that it is interested to receive?; 3GPP TSG-RAN WG2 Meeting #75; R2-114430; Aug. 22-26, 2011; Athens, Greece.

Huawei; [75#35]—LTE: MBMS Service Continuity; 3GPP TSG RAN WG2 #75bis; R2-115017; Oct. 10-14, 2011; Zhuhai, China.

Barazilian Office Action with English translation dated Apr. 7, 2020; Brazilian Appln. No. 112014008713-0.

Chinese Office Action with English translation dated Mar. 27, 2020; Chinese Appln. No. 201711026422.6.

Korean Office Action with English translation dated Apr. 13, 2020; Korean Appln. 10-2012-0087760.

Katz; Adaptation and Mobility in Wireless Information Systems; Improving communication through "situation awareness"; IEEE Personal Communications; First Quarter 1994; XP011415559.

3GPP; 3rd Generation Paltnership Project; Technical Specification Group Radio Access Network Extending 850 MHz Study Item Technical Report (Release 9); 3GPP TR 37.806; V1.1.0; Aug. 2011; Valbonne, FR; R4-114382.

Brazilian Office Action with English translation dated Mar. 30, 2020; Brazilian Appln. No. BR112014004199-7.

Korean Notice of Allowance with English translation dated May 28, 2020; Korean Appln. No. 10-2013-0006771.

Nokia Siemens Networks et al.; Further considerations on inter-site DTX/DRX with HSDPA Multiflow; 3GPP TSG-RAN WG2 Meeting #77bis; R2-121777; Mar. 26-30, 2012; Jeju, South Korea.

Huawei et al.; Multiflow and DTX/DRX; 3GPP TSG-RAN WG2 #77; R2-120554; Feb. 6-10, 2012; Dresden, Germany.

European Search Report dated Jan. 26, 2016; European Appln. No. 13787085.3-1870 / 2849367 PCT/KR2013004109.

\* cited by examiner

METHOD AND APPARATUS FOR LOGGING INFORMATION

CROSS-REFERENCE TO RELATED APPLICATION(S)

This application is a continuation application of prior application Ser. No. 14/360,822, filed on May 27, 2014, which claimed the benefit under 35 U.S.C. § 371 of an International application filed on Jan. 9, 2013 and assigned application number PCT/KR2013/000188, and under 35 U.S.C. § 119(e) of a U.S. Provisional application filed on Jan. 9, 2012 in the U.S. Patent and Trademark Office and assigned Ser. No. 61/584,744, and U.S. Provisional application filed on Jan. 30, 2012 in the U.S. Patent and Trademark Office and assigned Ser. No. 61/592,568 and U.S. Provisional application filed on Feb. 6, 2012 in the U.S. Patent and Trademark Office and assigned Ser. No. 61/595,646, and U.S. Provisional application filed on May 21, 2012 in the U.S. Patent and Trademark Office and assigned Ser. No. 61/649,910 the entire disclosure of each which is hereby incorporated by reference.

BACKGROUND OF THE INVENTION

Field of the Invention

The present invention relates to a logging method and apparatus of a terminal in an mobile communication system and, in particular, to a method and apparatus for logging, when the terminal fails connection, the information on the connection failure and acquiring the location information of the terminal efficiently in idle mode.

Description of the Related Art

The mobile communication system developed for the user to communicate on the move. With the rapid advance of technologies, the mobile communication system has evolved to the level capable of providing high speed data communication service beyond the early voice-oriented services. Recently, as one of the next generation mobile communication system, Long Term Evolution-Advanced (LTE-A) is on the standardization by the 3rd Generation Partnership Project (3GPP). LTE is a technology for realizing high-speed packet-based communications with the data rate higher than the currently available data rate aims at commercial deployment around 2010 timeframe.

With the evolution of the 3GPP standard, many studies being conducted for optimization of radio networks as well as improvement of data rate. In the initial radio network configuration or optimization stage, a base station or a base station controller should collect radio environment information related to its own cell coverage, and this process is called Drive Test. The conventional drive test is very time-consuming and laborious task performed in such a way that an operator carries the test apparatuses on a vehicle while performing the measurement task repeatedly for a long time. The measurement result is used to configure the system parameters of the base stations or base station controllers. Such a conventional drive test increases total costs and time of the radio network optimization and maintenance. Study on minimization of drive tests and enhancement of radio environment analysis process and manual configuration is being conducted in the name of MDT (Minimization of Drive Test). In more detail, the terminal measures the cell information and supplementary information on the neighbor eNBs. The terminal reports the radio channel measurement information to the eNB periodically or immediately in response to a specific event or after a predetermined time has elapsed from the time point when the radio channel measurement information has been logged. At this time, the UE operation of transmitting the measured cell information and other supplementary information to the UE is referred to as MDT measurement information report. If it is in the state capable of communicating with the eNB, the terminal transmits the neighbor cell information measurement result to the eNB immediately. Otherwise, if it is not in the state capable of communicating with the eNB, the terminal retains the logged measurement information and, when it becomes possible to communicate with the eNB, transmits the retained MDT measurement report. In the following description, the radio channel information measured by the terminal and other supplementary information are referred to as MDT measurement information, and the operation transmitting the MDT measurement information from the terminal to a base station is referred to as MDT measurement information report. When reporting MDT measurement information, if it is possible to communicate with the base station, the terminal transmits the MDT measurement information immediately. Otherwise, it is impossible to communicate with the base station currently, the terminal waits until it becomes possible to communicate with the base station. The base station uses the MDT measurement information reported by the terminal for cell area optimization.

FIG. 1 is a diagram illustrating a drive text without MDT scheme and MDT execution procedure.

Referring to FIG. 1, the conventional drive test is performed in a way of measuring signal state while roaming around the service area to search for coverage holes on a vehicle carrying the measurement device.

In MDT, the terminal performs this operation instead. A Network Monitoring System (NMS) 105 may instruct to perform MDT. At this time, the NSM 105 provides an Element Manager (EM) 110 with configuration information necessary for MDT. The EM 110 generates MDT configuration to an evolved Node B (eNB) 115. The eNB 115 sends a User Equipment (UE) 120 the MDT configuration information to instruct to perform MDT as denoted by reference number 125. The UE 120 performs MDT to collect MDT measurement information. The MDT information may include location and time information as well as the signal measurement information. The collected MDT measurement information is reported to the eNB 115 as denoted by reference number 130, and the eNB 115 sends the MDT measurement information to a Trace Collection Entity (TCE) 135. The TCE 135 is a server for collecting MDT measurement information.

DISCLOSURE OF INVENTION

Technical Problem

The present invention has been proposed to solve the above problem and aims to provide an apparatus and method for logging channel status or connection failure effectively.

Solution to Problem

In accordance with an aspect of the present invention, a Radio Resource Control (RRC) failure log method of a terminal includes attempting random access, logging, when the random access fails, information on the failure, and transmitting, when the random access succeeds, the failure information logged before the success to a connected base station.

In accordance with another aspect of the present invention, a Radio Resource Control (RRC) failure log reception method of a base station includes determining, when an RRC connection setup complete (RRCConnectionSetupComplete) message is received from a terminal, whether the RRC connection setup complete message includes an indicator indicating whether the terminal has information on random access failure, transmitting, when the RRC connection setup complete message includes the indicator, a terminal information request (UE Information Request) message requesting the terminal for the information on the random access failure to the terminal, and receiving the information on the random access failure from the terminal.

In accordance with another aspect of the present invention, a channel status information log method of a terminal includes determining whether a channel status value measured by the terminal in an idle mode is less than a threshold value, turning, when the channel status value is less than the threshold value, on a positioning module, acquiring location information of the terminal from the positioning module, logging the location information and the channel status information of the terminal in association with each other, and transmitting, when the terminal transitions to a connected mode, the location information and the channel status information of the terminal to the connected base station.

In accordance with still another aspect of the present invention, a channel status information log configuration method of a base station includes receiving a terminal (UE) capability information message from a terminal, generating, when the terminal capability information includes an indicator indicating that the terminal has a positioning module, a configuration capable of allowing the terminal to measure, when the terminal logs channel status information in idle mode, location using the positioning module and logs location information in association with the channel status information, and transmitting the generated configuration to the terminal.

Advantageous Effects

The apparatus and method of the present invention is advantageous in logging channel status or connection failure effectively.

DETAILED DESCRIPTION OF EXEMPLARY EMBODIMENTS

Figure 1:
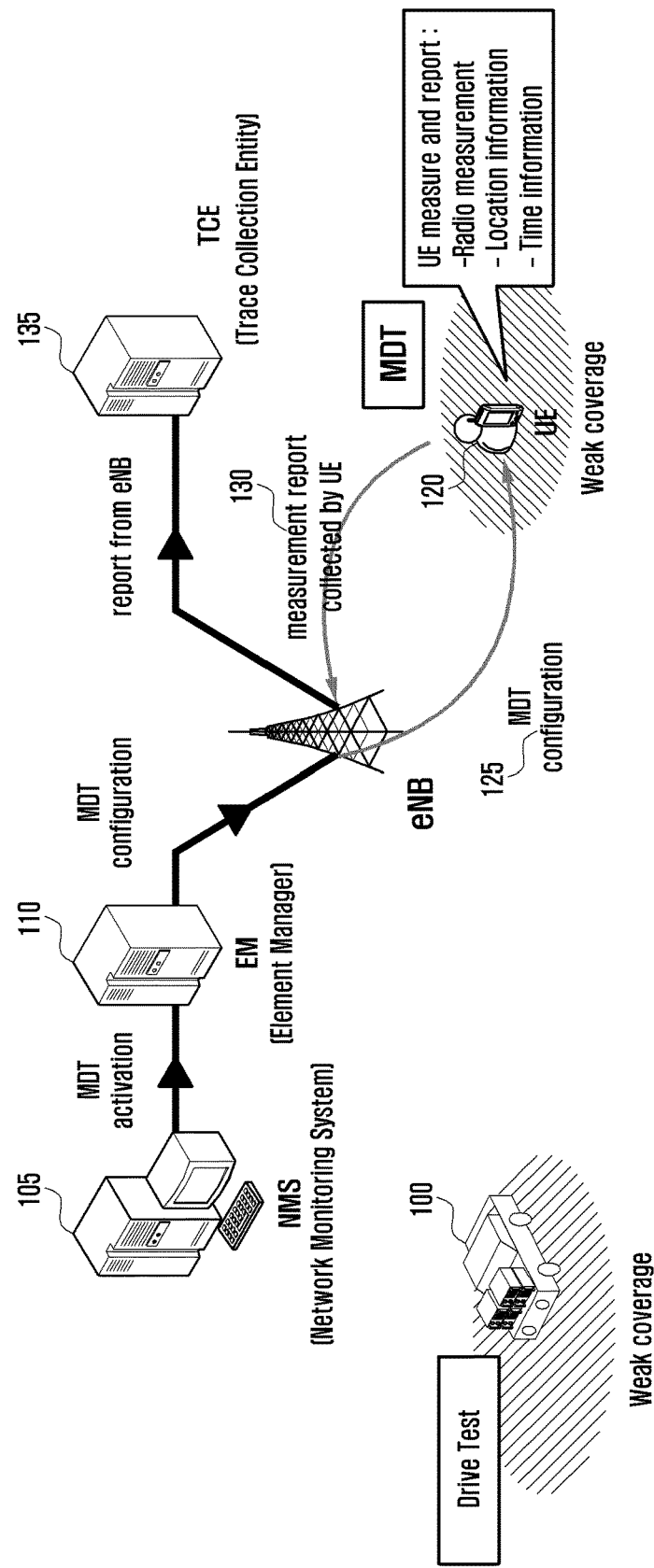
FIG. 1 is a diagram illustrating a drive text without MDT scheme and MDT execution procedure.

Exemplary embodiments of the present invention are described with reference to the accompanying drawings in detail.

Detailed description of well-known functions and structures incorporated herein may be omitted to avoid obscuring the subject matter of the present invention. This aims to omit unnecessary description so as to make the subject matter of the present invention clear.

For the same reason, some of elements are exaggerated, omitted or simplified in the drawings and the elements may have sizes and/or shapes different from those shown in drawings, in practice. The same reference numbers are used throughout the drawings to refer to the same or like parts.

The present invention relates to a method and apparatus for logging useful information in the connection failure for the purpose of MDT and acquiring location information of the UE in idle mode efficiently.

The MDT procedure is described before explaining the present invention in detail.

Figure 2:
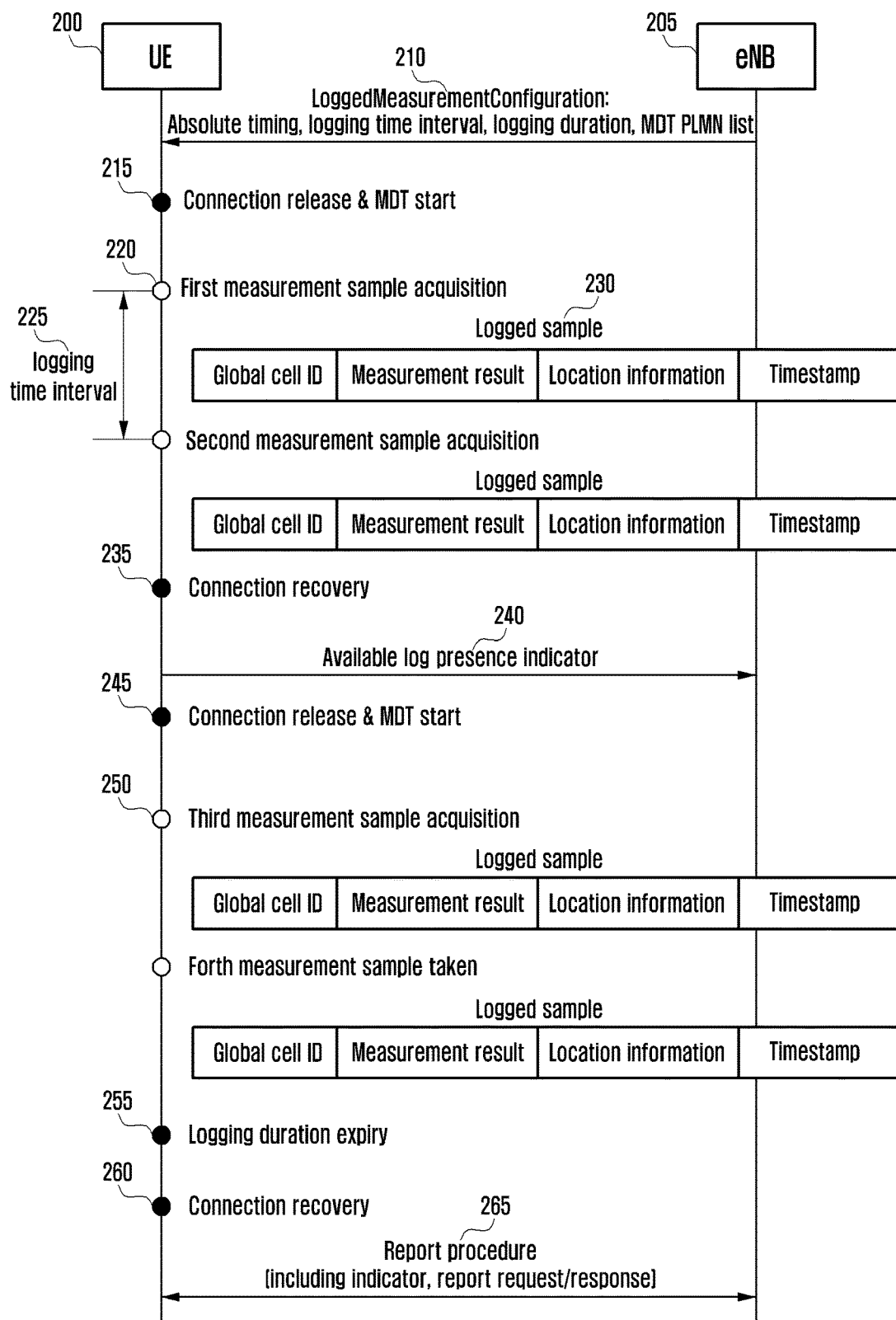
FIG. 2 is a signal flow diagram illustrating the MDT procedure.

FIG. 2 is a signal flow diagram illustrating the MDT procedure. At step 210, the eNB 205 sends the UE 200 in connected mode the information necessary for MDT configuration, i.e. channel measurement configuration informations. The information necessary for MDT configuration is referred to as MDT configuration information. The MDT configuration information includes at least one of absolute timing, logging interval, logging duration, and MDT Public Land Mobile Network (PLMN) list.

The logging interval is a kind of sampling cycle for use in periodic downlink pilot signal measurement. The UE 200 collects and logs the MDT measurement information at the logging interval.

The logging duration is the duration for performing MDT. The UE performs signal measurement for the logging duration at the logging interval. If the logging duration expires, the UE 200 stops signal measurement.

The MDT PLMN list is the list of PLMNs to which the UE 200 may report the MDT measurement information.

At step 215, if the RRC state of the UE 200 transitions from the connected mode to the idle mode, the UE 200 starts MDT. At step 220, the UE measures signals and logs the measurement result (sample). The measurement and logging is performed repeatedly before the expiry of the logging duration since the completion of the first measurement and logging. Each measurement sample 230 includes the measurement result informations for MDT. The measurement result information logged in the logged sample may include serving cell identifier (global cell id), serving cell channel measurement result value (e.g. Reference Signal Received Power (RSRP)/Reference signal Received Quality (RSRQ)), channel measurement result values of neighbor cells, location information of UE 200, and relative timestamp.

The UE 200 reestablishes the connection at step 235. If the UE 200 enters the connection mode, it sends the eNB 205 an indicator indicating whether any available log is present at step 240. That is, the UE 200 notifies the eNB 205 of presence/absence of logged MDT measurement information. The eNB 205 may request the UE to report MDT measurement information depending on the situation. If the eNB 205 requests the UE 200 for MDT measurement information report, the UE 200 reports the MDT measurement information logged until then and discards the logged information. If the eNB 205 does not request the UE 200 for MDT measurement information report, the UE 200 retains the logged information constantly.

If the UE 200 enters the idle mode again before the expiry of the logging duration at step 245, it continues MDT operation at step 250 to collect MDT measurement information. When the logging duration expires, the UE 200 may consider the time in the connected mode or not, depending on the embodiment. If the logging duration expires at step 255, the UE 200 stops MDT operation.

The UE 200 enters the connected mode again at step 260. The UE 200 notifies the eNB 205 of the presence of logged MDT measurement information at step 265 and, if the eNB 205 requests for MDT measurement information report, reports the logged MDT measurement information to the eNB 205.

Figure 3:
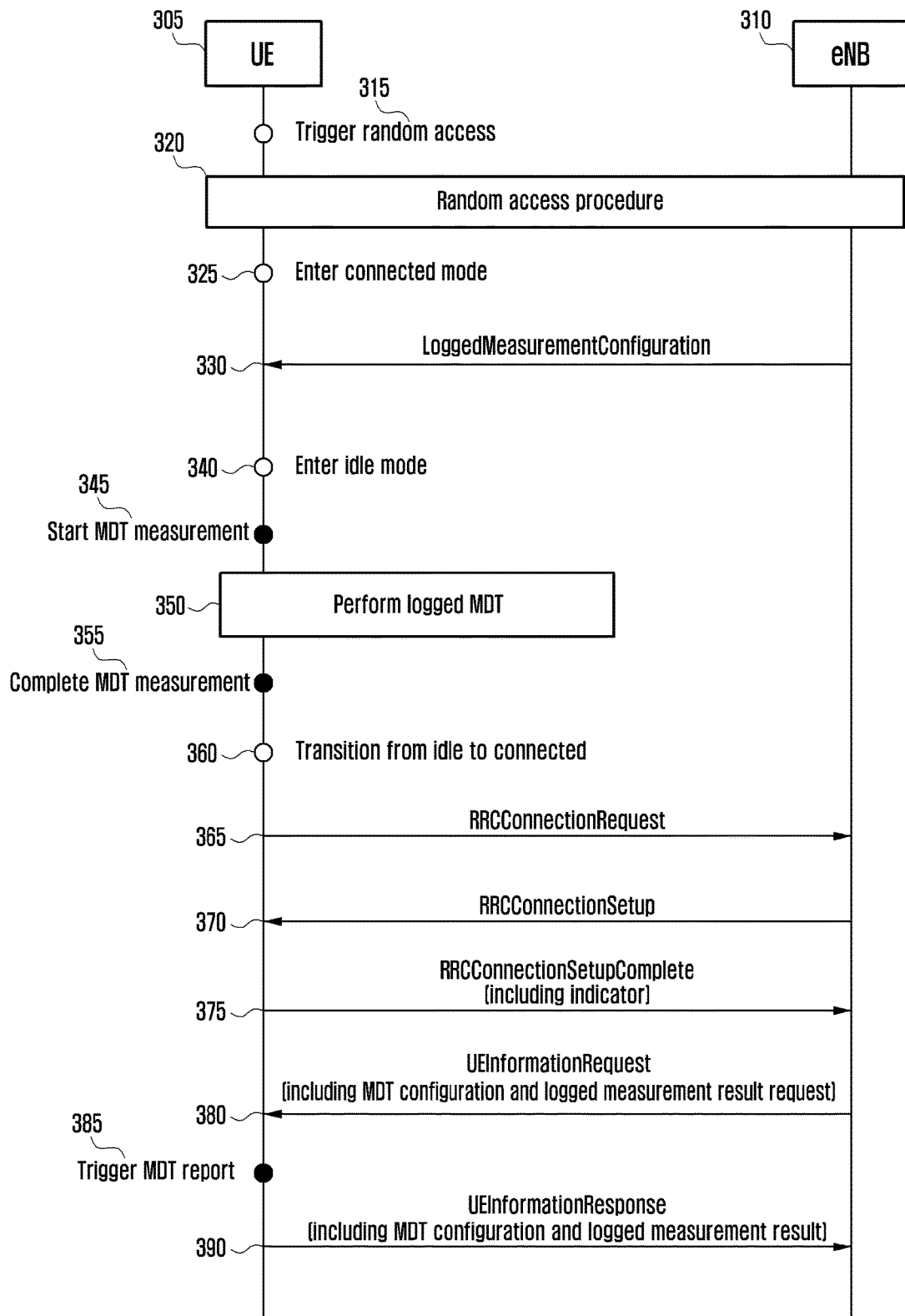
FIG. 3 is a signal flow diagram illustrating a procedure in which the UE 305 reports logged channel measurement information in response to the request of the eNB 310.

FIG. 3 is a signal flow diagram illustrating a procedure in which the UE 305 reports logged channel measurement information in response to the request of the eNB 310. The UE 305 triggers random access for communication with the eNB 310 at step 315. The UE 305 attempts random access at step 320.

Afterward, the UE 305 enters the connected mode at step 325. Then the eNB 310 sends the UE 305 the LoggedMeasurementConfiguration message at step 330. The LoggedMeasurementConfiguration message includes the information necessary for the UE 305 to perform MDT in the idle mode, i.e. channel measurement configuration information. Next, the UE 305 enters the idle mode at step 340 and, if the MDT measurement duration starts, performs MDT measurement at step 345. If the indicated logging duration expires, the UE 305 stops MDT measurement at step 355.

Afterward, the UE 305 determines to transition to the connected mode at step 360. The UE 305 sends the eNB 310 the RRCConnectionRequest message at step 365. If it is determined to accept the RRC connection request, the eNB 310 sends the UE 305 the RRCConnectionSetup message at step 370.

The UE 305 entered the connected mode notifies the eNB 310 of the presence of channel measurement information logged in the idle mode at step 375. For this purpose, the UE 305 transmits the RRCConnectionSetupComplete message including and indicator indicating the presence of channel measurement information logged in the idle mode. The UE 305 does not transmit the indicator to all PLMNs but, when the current Registered Public Land Mobile Network (RPLMN) is included in the MDT PLMN list, the corresponding RPLMN. The RPLMN denotes the PLMN serving the UE. When the UE 305 powers on or needs to change PLMN, it reports a PLMN considered as available, i.e. selected PLMN, through Tracking Area Update (TAU) procedure to the Mobility Management Entity (MME). If it is determined that the selected PLMN is available, the MME notifies the UE 305 of the availability such that the selected PLMN becomes RPLMN.

In the case of handover, the UE 305 may include the indicator in the RRCConnectionReconfigurationComplete message. The reason for transmitting the indicator to the eNB 310 is to notify the eNB 310 of the presence of MDT measurement information logged by the UE 305 and provide a basis for determining whether the eNB 410 requests for the MDT measurement information.

Typically, the UE 305 may log a large amount of channel measurement information because it stay in the idle mode for a long time. If the UE 305 transitions to the connected mode, it has to consume large amount of resources for transmitting the logged information. Accordingly, the eNB 310 has to determine whether to request for the MDT measurement information in consideration of the current radio capacity status. If it is determined that the channel measurement information logged by the UE 305 is useful, the eNB 310 requests the UE 305 for the MDT measurement information using the UEInformationRequest message at step 380. Upon receipt of the UEInformationRequest message from the eNB 310, the UE triggers transmission of the logged MDT measurement information at step 385. Typically, the logged MDT measurement information has low necessity of urgent transmission, it is preferred to transmit the MDT measurement information in consideration of the priorities of other RRC messages and data. The UE 305 sends the eNB 310 the UEInformationResponse including the MDT measurement information at step 390. The UE 305 may discard the MDT measurement information which has been reported to the eNB 310 already. At step 390, the logged MDT configuration may be transmitted along with the logged measurement result.

When Radio Link Failure (RLF) occurs, the UE logs the information necessary for cell optimization for the purpose of MDT. In Rel-11 LTE standard, discussion is under way for applying such approach to the RRC connection establishment. The first embodiment of the present invention proposes the useful informations logged by the UE when the RRC connection establishment fails. The second embodiment proposes a method for acquiring the location information of the UE in the idle mode efficiently.

First Embodiment

When communication is necessary, the LTE UE enters the connected mode through RRC connection establishment procedure. The RRC connection establishment procedure is comprised of exchanging three types of RRC messages between the UE and the eNB. At the first step, the UE sends the eNB an RRC connection request message. This message includes a UE identifier (UE ID) and an establishment cause value. At the next step, the eNB sends the UE an RRC connection setup message. This message includes radio resource configuration information necessary for the UE to establish a connection with the eNB. The RRC connection request message and the RRC connection setup message are exchanged between the eNB and the UE through radio access procedure. The random access procedure is described later in detail. At the third step, the UE sends the eNB an RRC connection setup complete message. These messages are exchanged successfully, the UE communication data with the eNB.

The RRC connection establishment procedure may fails due to various reasons. Typically, if the messages are not exchanged normally due to the bad radio channel status, the RRC connection establishment procedure fails. Accordingly, if the eNB is capable of checking whether the RRC connection establishment procedure has failed, this may be useful for optimizing the cell service area. In this embodiment, the information including the RRC connection establishment failure report is disclosed based on the method for reporting the RRC connection establishment failure similar to the RLF report.

Figure 4:
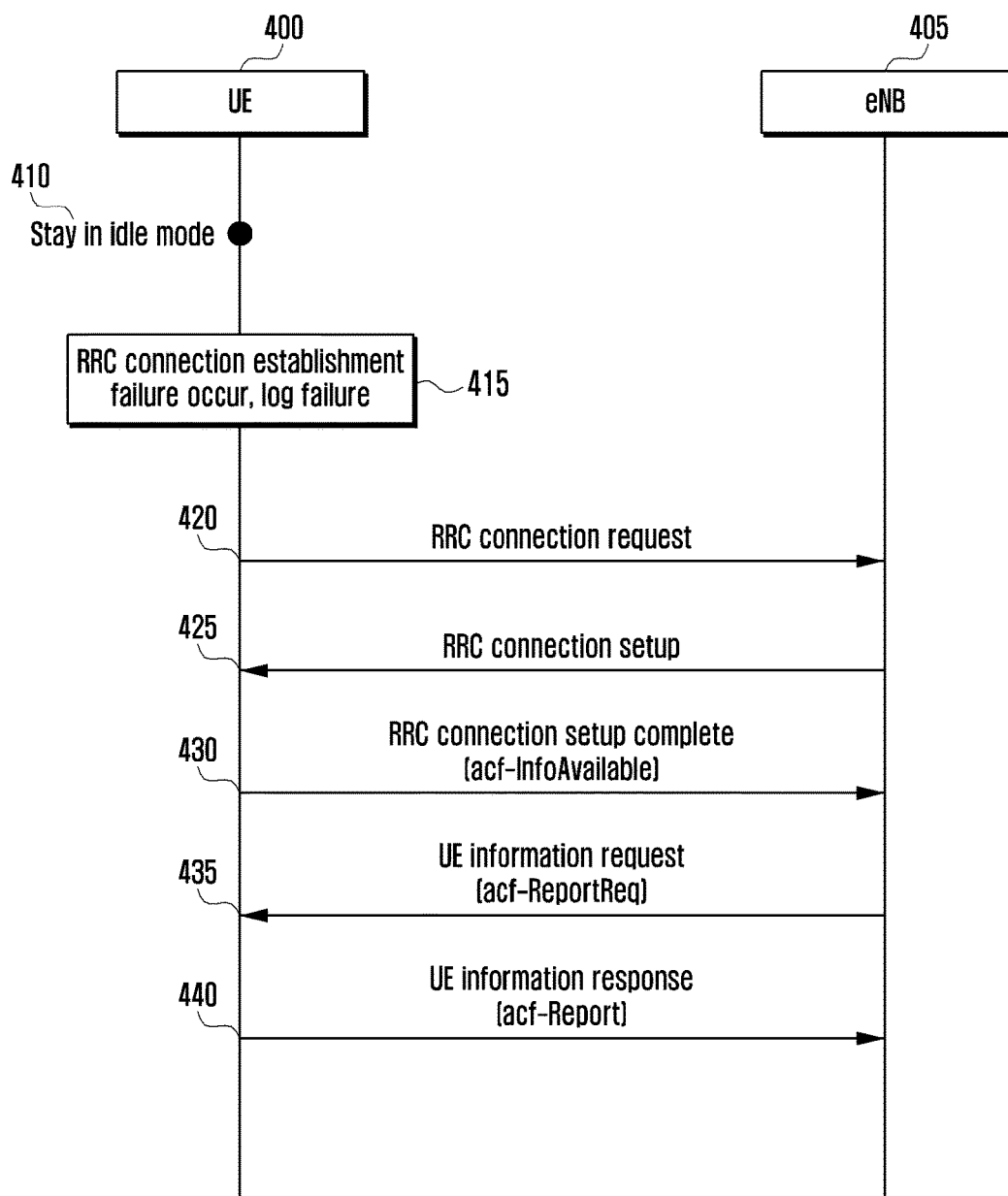
FIG. 4 is a signal flow diagram illustrating the RRC connection establishment failure report procedure.

FIG. 4 is a signal flow diagram illustrating the RRC connection establishment failure report procedure. The UE 400 is in the idle mode at step 410. Afterward, the UE 400 attempts RRC connection establishment procedure for communication with the eNB 405 at step 415. However, the procedure fails due to the bad channel condition. If the procedure fails, the UE 400 reports the failure to the UE NAS. After predetermined time elapses, the UE NAS attempts RRC connection establishment procedure again. If this procedure fails, the UE 400 logs the useful information such as channel measurement informations of the serving and neighbor cells and cell IDs.

The UE 400 attempts the RRC connection establishment procedure again. For this purpose, the UE 400 sends the eNB 405 the RRC connection request message at step 420. The eNB 405 sends the UE 400 the RRC connection setup message at step 425. The UE 400—sends the eNB 405 the RRC connection setup complete message at step 430. The RRC connection setup complete message includes an indicator indicating the presence of the information on the RRC connection establishment failure, i.e. acf-InfoAvailable IE (Information Element), logged at step 415. This indicator is included in the RRC connection setup complete message only when a predetermined condition is fulfilled. For example, if the RPLMN of the eNB configured with RRC connection matches one of the RPLMN, Equivalent PLMNs (EPLMNs), selected PLMN at the time when T300 expires, the UE 400 includes the indicator in the RRC connection setup complete message. According to an alternative embodiment, if the RPLMN of the eNB configured with RRC connection matches one of the RPLMN, Equivalent PLMNs (EPLMNs), selected PLMN, the UE 400 includes the indicator in the RRC connection setup complete message and, otherwise if the RPLMN of the eNB configured with RRC connection matches the some remainders of the RPLMN, Equivalent PLMNs (EPLMNs), selected PLMN, excludes the indicator in the RRC connection setup complete message.

If it is determined that the logged information report is necessary after the receipt of the indicator, the eNB 405 requests the UE 400 to report the logged information using the UE information request message. For this purpose, the UE information request message includes acf-ReportReq indicator. The acf-ReportReq indicator is the indicator of requesting the UE 400 to report the logged information.

The UE 400 reports the logged information to the eNB 405 using the UE information response message at step 440. The UE information response message includes the acf-Report IE. The acf-Report IE includes the information logged when the RRC connection establishment failure has occurred.

The RRC connection establishment procedure has a close relationship with the random access procedure. This is because the RRC connection request message and the RRC connection setup message are exchanged in the random access procedure. Since the UE is in the idle mode before the RRC connection establishment, it attempts connection to the eNB through random access procedure.

Figure 5:
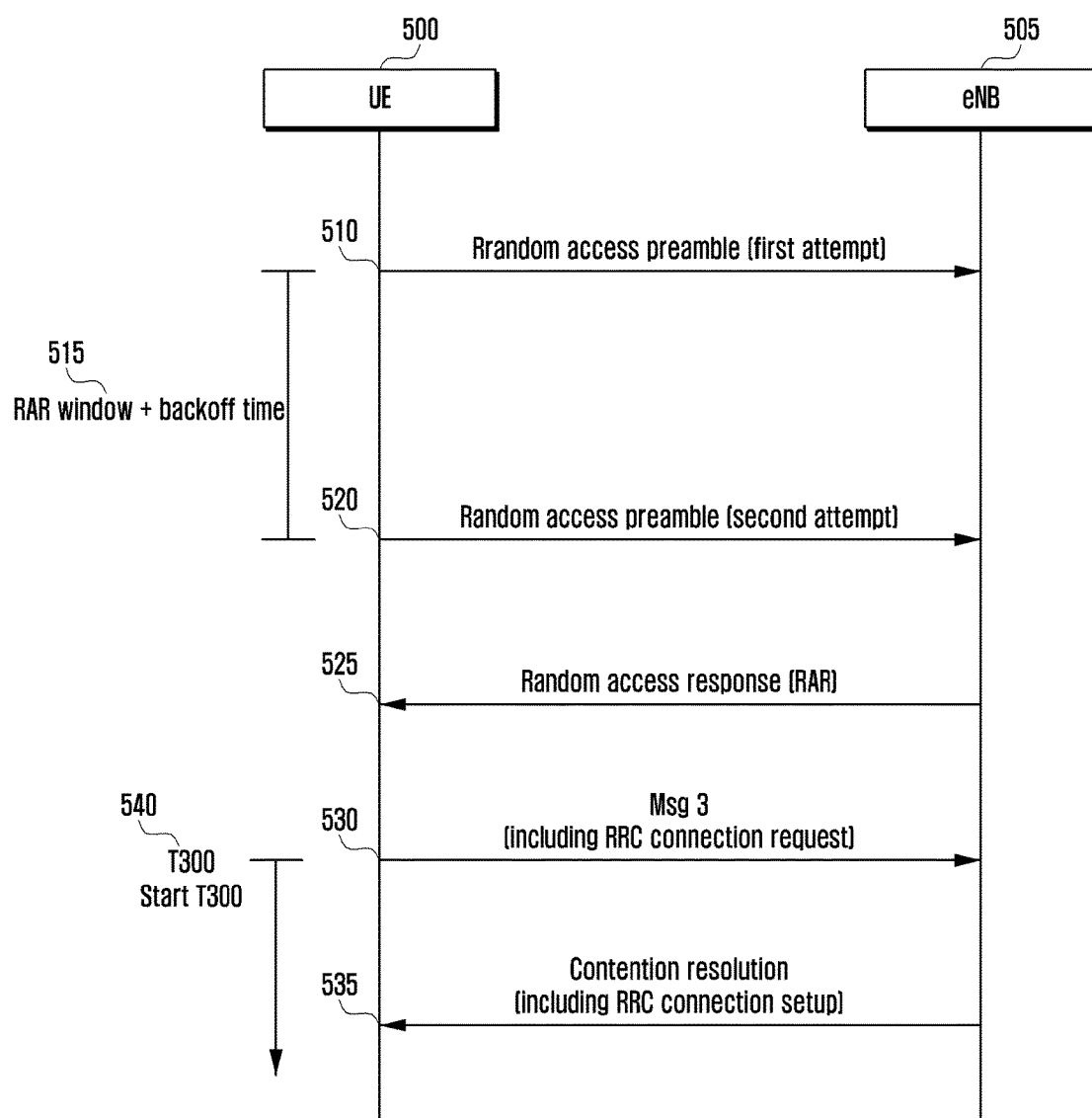
FIG. 5 is a signal flow diagram illustrating the random access procedure.

FIG. 5 is a signal flow diagram illustrating the random access procedure.

The UE 500 transmits a random access preamble for connection to the eNB 505 at step 510. The preamble may not be received by the eNB due to the radio channel status. Accordingly, the UE 500 waits for a response message, i.e. Random Access Response (RAR) during a predetermined RAR window and, if not RAR matching the preamble is received, waits further during a backoff time. That is, the UE 500 waits during the period 515 of sum of the RAR window and the backoff time and then retransmits the random access preamble at step 520. If the backoff time of the eNB is not configured in advance, the backoff time is 0.

At step 525, the UE 500 receives the RAR message successfully in the RAR window. The UE sends the eNB 505 a msg 3 using the radio resource indicated in the RAR message at step 530. Depending on the purpose of the random access, the msg 3 include different message. In the case of the initial access, the msg 3 includes the RRC connection request message.

The UE 500 transmits the RRC connection request message and starts the T300 timer simultaneously. If the RRC connection establishment procedure fails before the expiry of the T300 timer, the UE 500 regards that the RRC connection establishment failure has occurred. In this case, the UE 500 logs the information on the access failure. The eNB 505 sends the UE 500 a contention resolution message at step 535. The contention resolution message includes the RRC connection setup message.

In this embodiment, the useful informations logged by the UE when the RRC connection establishment fails are disclosed. These informations are reported to the eNB when the UE connects to the eNB again successfully. Since it has been described with reference to FIG. 4, detailed description on the report procedure is omitted herein. For cell service area optimization, the useful informations logged by the UE are enumerated as follows.

The informations logged basically, when the RRC connection establishment fails, may include the serving can neighbor cell informations listed hereinbelow. The information on the location where the failure has occurred also may include.

1. cellGlobalId: cell identifier (id) of the cell where access failure has occurred 2. measResultCurrentCell: channel measurement information of current serving cell (e.g. RSRP/RSRQ)

3. measResultNeighCells: channel measurement information of neighbor cells 4. locationInfo: location information on area where access failure has occurred As described above, since the RRC connection establishment has close relationship with the random access procedure, the informations logged when the RRC connection establishment has failed may further include the informations enumerated hereinbelow.

5. PowerLimitationReached: Indicate whether power shortage phenomenon has occurred in the random access procedure. The power shortage phenomenon is the phenomenon in which the required power exceeds the maximum power (max power). This information means that the UE is at an area where the UE undergoes very bad radio channel condition so as to use its maximum transmit power.

6. numberOfPreamblesSent: number of preambles transmitted in the random access procedure In addition, the following informations may be included in the information logged when the RRC connection establishment has failed.

Figure 6:
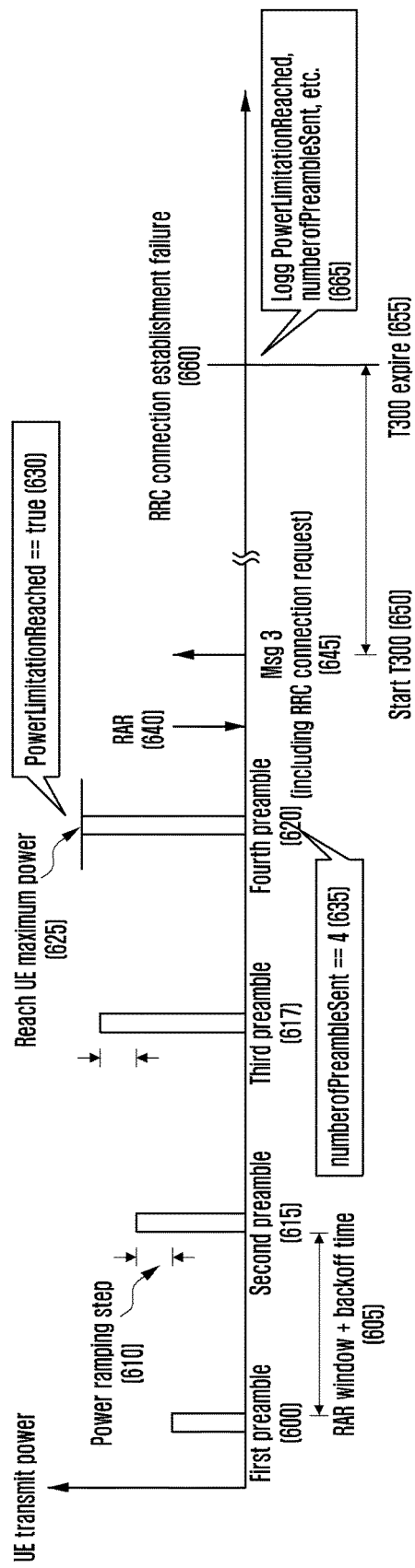
FIG. 6 is a diagram illustrating an RRC connection establishment attempt procedure according to the first embodiment of the present invention.

7. RARrcvd: indicate whether a valid RAR has been received in the random access procedure in which RACH-failure has occurred 8. BackoffApplied: information on the backoff applied in the random access procedure FIG. 6 is a diagram illustrating an RRC connection establishment attempt procedure according to the first embodiment of the present invention. A description is made of the PowerLimitationReached indicator and the numberOfPreamblesSen variable with reference to FIG. 6. The UE transmits the first preamble at step 600. The UE monitors whether a RAR message is received in response to the preamble during the RAR window. If it fails to receive RAR, the UE waits further for a backoff time. That is, the UE waits during the period 650 of sum of the RAR window and the backoff time.

Afterward, the UE transmits the second preamble at step 615. At this time, the UE increases the transmit power by power ramping step to transmit the preamble. The reason for increasing the transmit power is to increases the transmission success probability by increasing the UE transmission power in the case that the preamble transmission fails due to the bad radio channel status. The maximum number of preamble retransmissions is restricted. The second preamble transmission also fails and thus the UE increases the transmit power to transmit the third preamble at step 617. The third preamble transmission also fails and thus the UE increases the transmit power to transmit the fourth preamble at step 620.

By increasing the transmit power several times, the transmit power of the UE reaches the maximum transmit power at step 620. At this time, since the UE transmit power has reached the UE maximum transmit power, PowerLimitationReached IE 630 is set to 'true'. If the UE has received the RAR message successfully at step 640, the number of preamble transmissions is 4 and thus numberofPreambleSent IE is set to 4.

Afterward, the UE sends the eNB an msg 3 message 645 using the radio resource indicated by the RAR message. The msg 3 message includes the RRC connection request message. The UE transmits the message and starts the T300 timer simultaneously. If the RRC connection establishment procedure has not completed before the expiry of the T300 timer (655), the UE regards that the RRC connection establishment procedure has failed at step 660. As a consequence, the UE logs the informations enumerated above at step 665. At this time, the PowerLimitationReachedand numberofPreambleSent are logged together at step 665.

Figure 7:
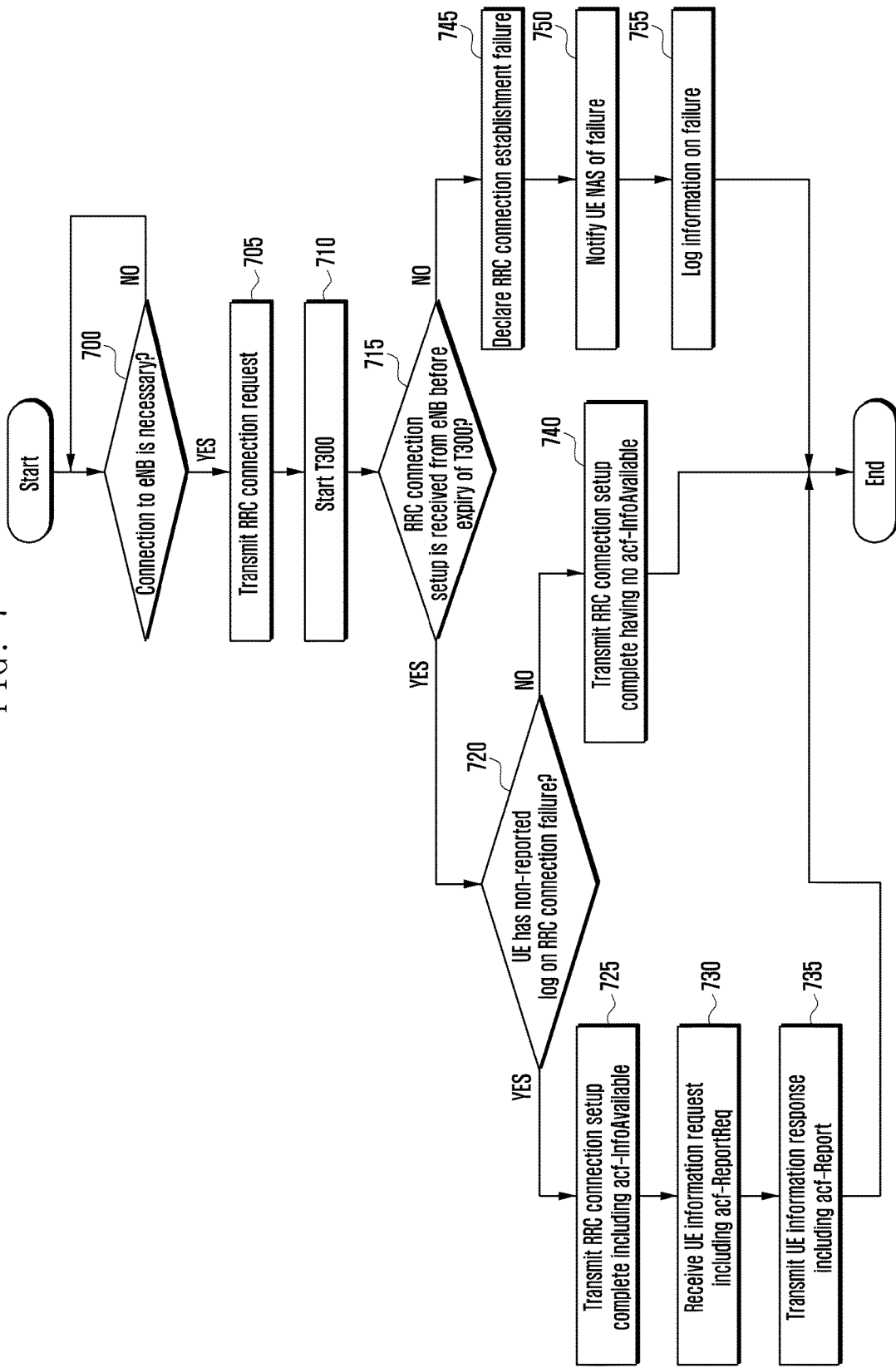
FIG. 7 is a flowchart illustrating an RRC connection procedure according to an embodiment of the present invention.

FIG. 7 is a flowchart illustrating an RRC connection procedure according to an embodiment of the present invention. FIG. 7 shows the UE operation. The UE determines whether it is necessary to connect to the eNB for data transmission at step 700. If it is necessary to connect to the eNB, the procedure goes to step 705 to start RRC connection establishment procedure. If it is not necessary to the eNB, the UE monitors until it becomes necessary to connect to the eNB.

The UE sends the eNB the RRC connection request message at step 705. The UE starts the T300 timer at step 710. The T300 timer starts at the time when the RRC connection request is transmitted and stops when the RRC connection setup or RRC connection reject message is received from the eNB, the cell reselection is performed, or a connection establishment withdrawal instruction is issued by a higher layer. If the T300 timer expires, the UE regards this as RRC connection establishment failure and notifies the higher layer of this.

At step 715, the UE determines whether the RRC connection setup message is received from the eNB before the expiry of the T300 timer. If the RRC connection setup message is not received from the eNB before the expiry of the T300 timer, the UE declares RRC connection establishment failure at step 745 and notifies the UE NAS of the RRC connection establishment failure at step 750. The UE also logs the information proposed in the present embodiment at step 755. That is, at least one of cellGlobalId, measResultCurrentCell, measResultNeighCells, locationInfo, PowerLimitationReached, numberOfPreamblesSent, RARrcvd, and BackoffApplied is logged.

If the UE receives the RRC connection setup message before the expiry of the T300 timer at step 715, the UE determines that the RRC connection establishment procedure has completed successfully. If the RRC connection establishment procedure has completed successfully, the procedure goes to step 720. The follow-up procedure is determined depending on whether any RRC connection establishment failure has ever occurred.

At step 720, the UE determines whether there is any non-reported RRC connection establishment failure. If there is any non-reported RRC connection establishment failure, the procedure goes to step 725 where the UE transmits the RRC connection setup complete message including acf-InfoAvailable IE. The acf-InfoAvailable IE is the indicator informing the eNB that UE has any failure report to send. The UE receives the UE information request message including the acf-ReportReq IE from the eNB at step 730. The acf-ReportReq IE indicates that the eNB requests the UE for failure report. At step 735, the UE sends the eNB the UE information response message including the acf-Report IE.

If there is no failure report to send at step 720, the procedure goes to step 740 where the UE transmits the RRC connection setup complete message including no acf-InfoAvailable IE.

Figure 8:
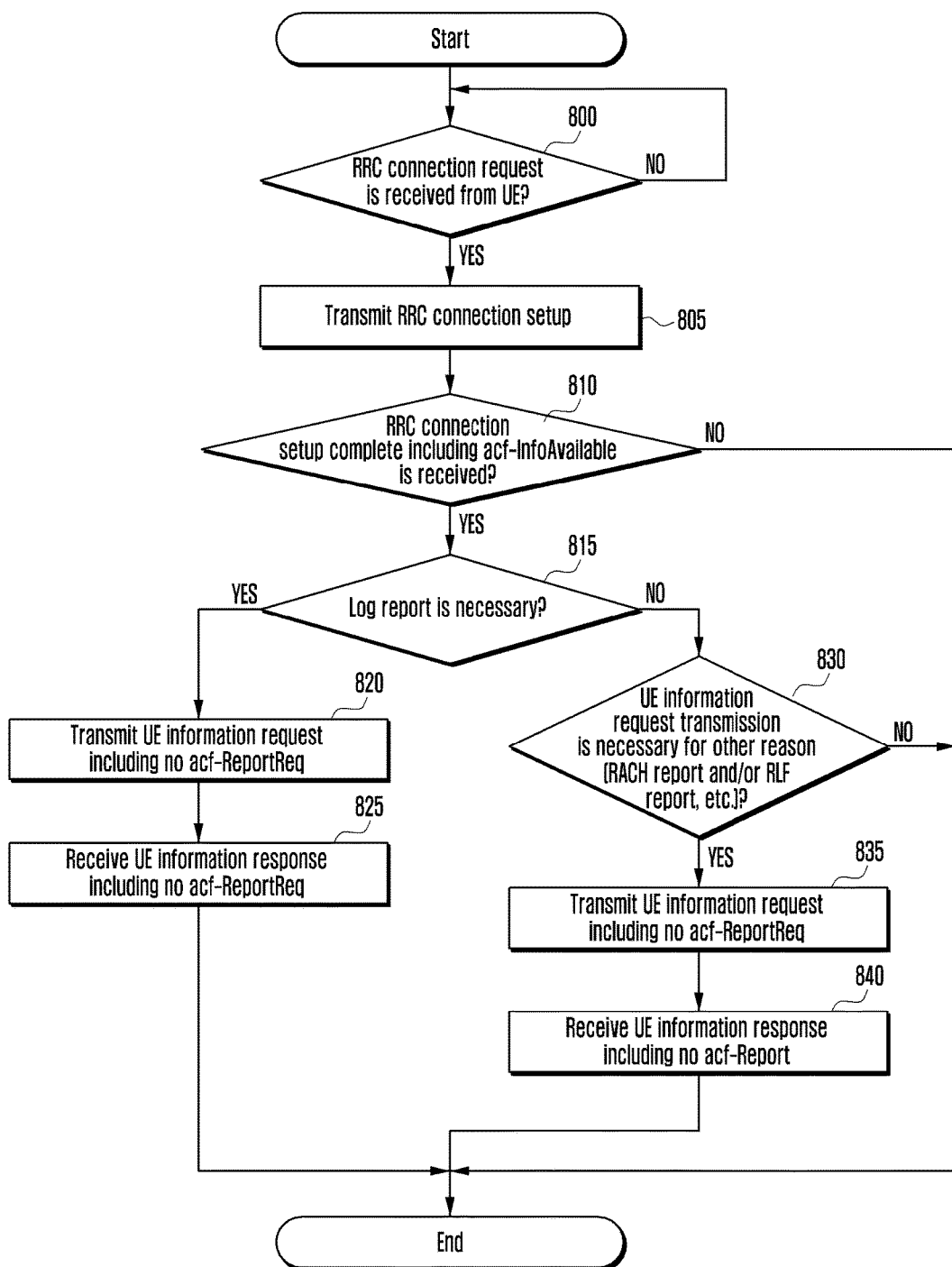
FIG. 8 is a flowchart illustrating the RRC connection procedure according to the first embodiment of the present invention.

FIG. 8 is a flowchart illustrating the RRC connection procedure according to the first embodiment of the present invention. FIG. 8 is a drawing for explaining the eNB operation. The eNB determines whether a RRC connection request message is received from the UE at step 800. If the RRC connection request message is received form the UE, the procedure goes to step 805. At step 805, the eNB sends the UE an RRC connection setup message. If the RRC connection message is not received from the UE, the eNB monitors until the RRC connection request message is received form the UE.

At step 810, the eNB determines whether the received RRC connection setup complete message includes acf-InfoAvailable IE. The adf-InfoAvailable IE is the indicator notifying the eNB that the UE has a failure report to send. If the RRC connection setup complete message includes the acf-InfoAvailable IE, the procedure goes to step 815. At step 815, the eNB determines whether it is necessary to receive the RRC connection establishment failure information logged by the UE. If it is necessary to receive the RRC connection establishment failure information, the eNB sends the UE the UE information request message including the acf-ReportReq IE at step 820. The acf-ReportReq IE is the indicator requesting the UE for the RRC co connection establishment failure report. At step 825, the eNB receives the UE information response message including acf-Report from the UE. The acf-Report IE includes the information on the failure report.

If it is not necessary to receive the information logged by the UE at step 815, the eNB has no need to send the UE the UE information request message. In this case, the procedure goes to step 830. At step 830, if the UE information request message is transmitted to the UE for other purposes such as RACH report and RLF report, the procedure goes to step 835. At step 835, the eNB sends the UE the UE information request message including no acf-ReportReq IE. At step 840, the eNB receives the UE information response message including no acf-Report.

Second Embodiment

The UE location information acquired by the Global Navigation Satellite System (GNSS) receiver has relatively high accuracy. Accordingly, for the MDT technology demanding accurate UE location information, the recent eNB has the function capable of requesting the UE in the connected mode for GNSS location information. This function may operate with the UE in the idle mode. However, the GNSS receiver is activated for the purpose of logged MDT, the UE has to consume extra power. Particularly, since the logged MDT is performed for up to 2 hours, continuing the positioning operation for such a long time is likely to be significant burden to the UE. Therefore, it is necessary to optimize the operation of the GNSS receiver. Although the description is directed to the GNSS receiver as an example, other types of positioning module capable of providing accurate location information with low power consumption can be applied too.

This embodiment discloses a method of operating the GNSS receiver only when a predetermined condition is fulfilled other than while the logged MDT lasts. Two or more conditions may be used. This embodiment includes a step for the eNB to provide information for use in determining whether a predetermined condition is fulfilled and a step for the UE to turn on or off the GNSS receiver in the MDT duration.

Figure 9:
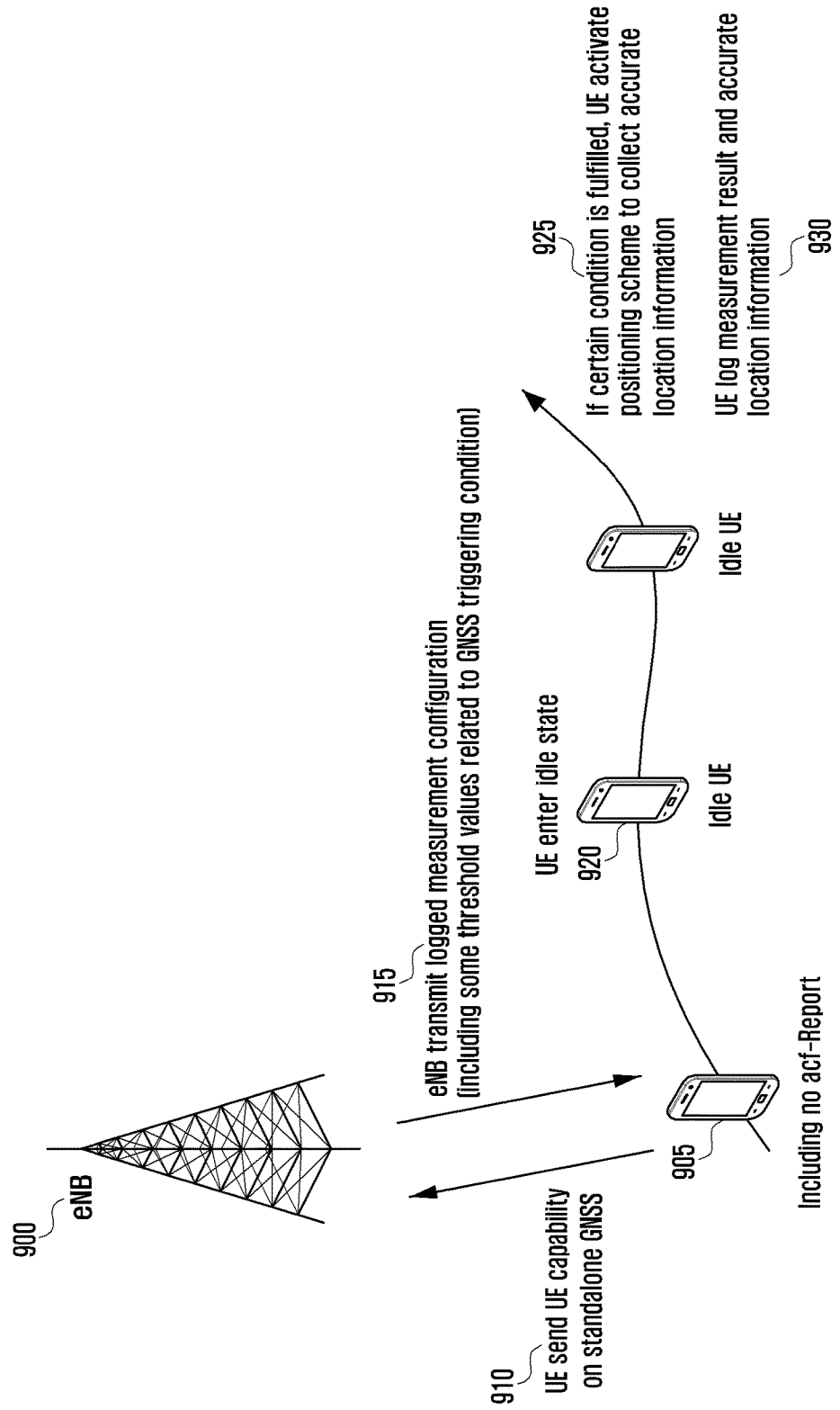
FIG. 9 is a diagram illustrating a GNSS location information acquisition procedure according to the second embodiment of the present invention.

FIG. 9 is a diagram illustrating a GNSS location information acquisition procedure according to the second embodiment of the present invention. The logged MDT is the procedure by which the UE logs the channel measurement information and location information and in the idle mode and, when transitioned to the connected mode, reports the logged information to the eNB.

At step 910, the eNB 905 notifies the eNB 900 whether it supports the positioning method capable of collecting accurate location information. Such positioning methods include standalone GNSS and network-assisted (NW-assisted) positioning.

The standalone GNSS is the method of deriving accurate location information of the corresponding UE using the signals received from a plurality satellites. Using the standalone GNSS, the UE is capable of acquiring the location information by itself without assistance of the eNB.

The NW-assisted positioning is the method of deriving the accurate location information of the corresponding UE in interoperation with the eNB.

The positioning scheme supportable by the UE 905 is a kind of UE capability information. The UE may notify the eNB of the supportable positioning scheme using various methods. In order to notify the supportabilities of various positioning schemes, a bitmap can be used. Also, it is possible to restrict the positioning scheme available for MDT to one such that the UE notify the eNB whether it supports the positioning scheme using a 1-bit indicator. For example, it is possible to restrict of using only the standalone GNSS. At this time, the UE notifies the eNB whether it supports the standalone GNSS using the 1-bit indicator.

At step 910, the UE 905 sends the eNB 900 of the UE capability information on whether it supports the standalone GNSS.

The eNB receives the UE capability information from the UE and, if it is determined that the UE supports the positioning scheme capable of collecting accurate location information, determines whether to have the UE perform the positioning scheme for logged MDT. If it is necessary for the UE to perform the positioning scheme, the eNB instructs the UE to perform logged MDT with the positioning scheme using the logged measurement configuration message.

The method for instructing to perform the positioning may be determined depending on whether the positioning scheme available for MDT is restricted to one. If the positioning scheme is restricted to one, the eNB 900 is capable of instructing the UE to perform it using the 1-bit indicator. Otherwise if multiple positioning schemes can be used, the eNB 900 has to notify the UE 905 of the positioning scheme to be used for MDT along with the information on whether to perform the positioning scheme. For example, if the UE 905 supports the standalone GNSS and NW-assisted positioning, it is possible to use two bits, the first one bit for indicating whether to perform the positioning and the second one bit for indicating one of the two positioning schemes. According to an alternative embodiment, the eNB 900 may indicate only whether to perform the positioning and the UE determines the positioning scheme to be sued.

In this embodiment, the eNB 900 is capable of instructing the UE 905 supporting the standalone GNSS to acquire GNSS location information with the GNSS receiver and logs the GNSS location information in logged MDT. In this case, the eNB 900 may configure and send at least one 'turn-on' condition of the GNSS receiver to the UE 905 to minimize the power consumption of the UE 905.

As an example of the turn-on condition of the GNSS receiver, the UE 905 may determine the turn-on or turn-off of the GNSS receiver based on the channel measurement information of the UE 905. The MDT technology aims to optimize the cell service area, i.e. discover coverage holes or weak coverage. Accordingly, if the information on the region in bad radio channel status of the serving cell and/or neighbor cells is provided more accurately, this information may have useful meaning. It is more efficient to collect the accurate GNSS location information on region having the particularly bad channel status than collecting the accurate GNSS location information throughout the entire area in view of conservation of constrained UE power.

In order to operate the GNSS receiver under these conditions, the eNB 900 sends the UE 905 the logged measurement configuration message including the related configuration information. In the case that the UE 905 determines whether to turn on or off the GNSS receiver based on the channel measurement information, the eNB 900 may include the RSRP and/or RSRQ threshold of the serving cell and/or neighbor cell for turn-on or turn-off in the logged measurement configuration information. When perform the logged MDT in the idle mode, the UE compares the threshold value and the measured value to determine whether to turn on or off the GNSS receiver. For example, in the case that the threshold value of the serving cell RSRP is given, the UE 905 turns on the GNSS receiver only when the measured serving cell RSRP is worse than the threshold value.

The UE transitions from the connected mode to the idle mode at step 920.

If the UE 905 is in the area scope indicated by in the logged measurement configuration message, i.e. in the area where the logged MDT is performed, the UE 905 performs the logged MDT at step 925.

Simultaneously, the UE performs positioning to acquire accurate location information. The GNSS receiver turns on to acquire the GNSS location information when the predetermined condition is fulfilled. For example, if the RSRP/RSRQ measurement value of the serving or neighbor cell is lower than the threshold value indicated in the logged measurement configuration message, the UE 905 turns on the GNSS receiver.

If the GNSS receiver is operating for other purpose than MDT, the UE logs the acquired GNSS location information independently of the condition. If the RSRP/RERQ measurement value becomes greater than the threshold value, the GNSS receiver stops operation. In this case, if the GNSS receiver is operating, it has to be blocked to stop the GNSS receiver for other purpose than MDT although the condition is fulfilled.

The UE 905 logs the MDT measurement information and acquired GNSS location information at step 930.

Figure 10:
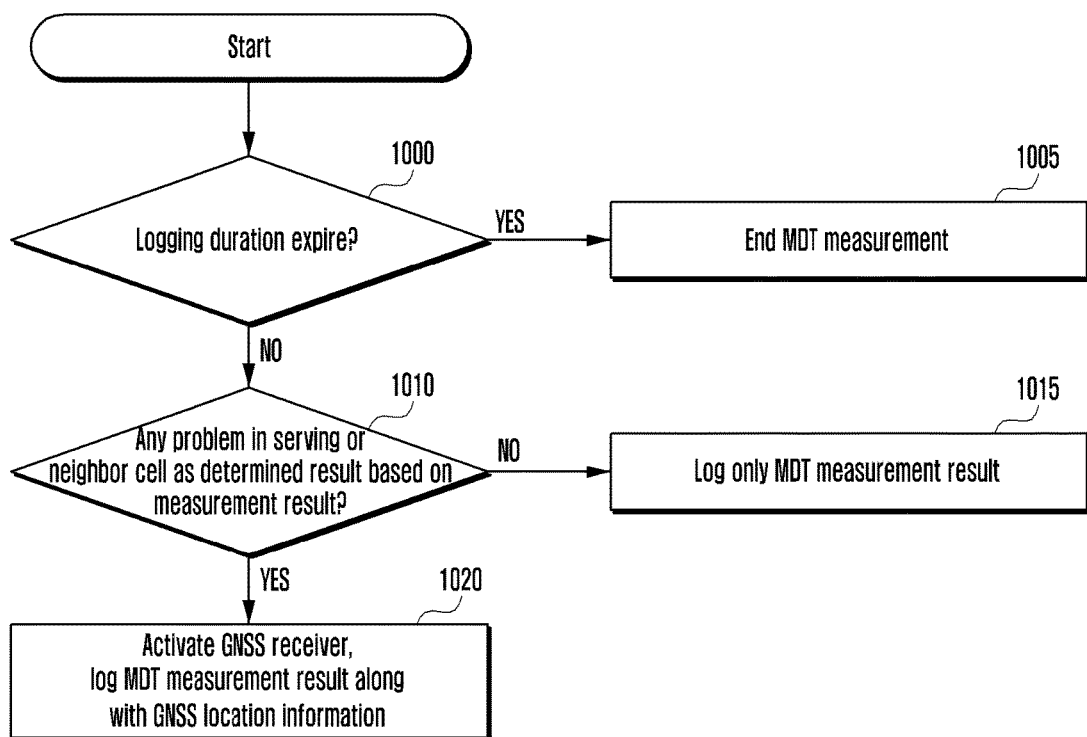
FIG. 10 is a flowchart illustrating the MDT measurement procedure according to the second embodiment of the present invention.

FIG. 10 is a flowchart illustrating the MDT measurement procedure according to the second embodiment of the present invention. The UE determines whether the logging duration has expired at step 1000. If the logging duration has expired, the UE performs no MDT-related measurement operation any longer at step 1005. If the logging duration has not expired, the procedure goes to step 1010.

At step 1010, he UE determines whether any problem such as coverage hole or weak coverage is predicted in the serving or neighbor cell based on the measurement result. There is a need of at least one condition for the UE to predict any problem. In order to determine whether the conditions are fulfilled, the eNB has to provide the UE with the related configuration information in advance. If no problem is predicted based on these conditions, the UE logs only the MDT measurement result at step 1015. Otherwise if any problem is predicted, the UE turns on the GNSS receiver and logs the GNSS location information acquired by the GNSS receiver along with the MDT measurement result at step 1020.

Figure 11:
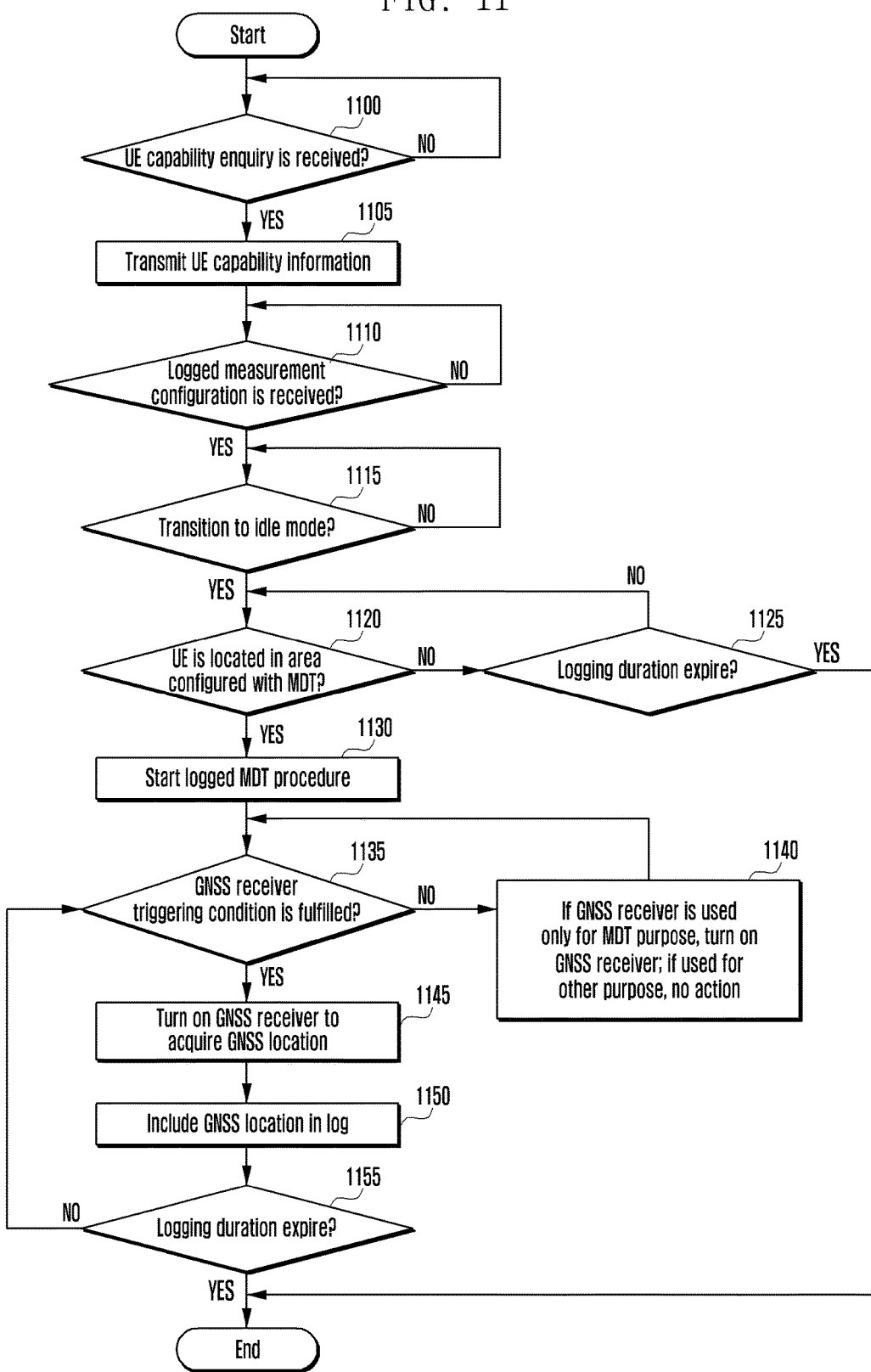
FIG. 11 is a flowchart illustrating the logging procedure according to the second embodiment of the present invention.

FIG. 11 is a flowchart illustrating the logging procedure according to the second embodiment of the present invention. The UE determines whether the UE capability enquiry message is received from the eNB at step 1100. The UE capability enquiry message is used to request for the UE capability when the eNB wants to know the functions supported by or capability of the UE. If the UE capability enquiry message is received from the eNB, the procedure goes to step 1105.

At step 1105, the UE reports the functions it supports to the eNB using the UE capability information message. The capability information message includes the information on whether the UE has the GNSS receiver and is capable of acquiring GNSS location information using it. Accordingly, the eNB is capable of determining whether to request the standalone GNSS positioning scheme in configuring the logged MDT of the UE.

At step 1110, the UE determines whether the logged measurement configuration message for logged MDT configuration is received from the eNB. If the measurement configuration message is received, the UE has to perform the logged MDT in the idle mode. If the UE receives the logged measurement configuration message, the procedure goes to step 1115.

At step 1115, the UE determines whether it has transitioned to the idle mode. If the UE has transitioned to the idle mode, it starts the logging duration to perform the logged MDT. If the UE has transitioned to the idle mode, the procedure goes to step 1120.

At step 1120, the UE determines whether it is located in the area designated for performing the logged MDT. The UE may be configured to log the measurement information in the designated area. By restricting the measurement information log to the interested area, it is possible to avoid unnecessary logging and save the UE memory. Such an interested area may be notified by the eNB to the UE in unit of cell or Tracking Area (TA). The TA is a set of cells as a unit for transmitting on-paging to a specific UE. If the UE is in this area, the UE determines whether the configured logged duration has expired at step 1125. If the logging duration has expired, the UE ends the logged MDT. Before the logging duration expires, the UE checks whether it is in the area configured for performing the MDT repeatedly.

If the UE is in the area configure to perform the MDT, the UE performs the logged MDT procedure at step 1130. In the idle mode, the UE collects and logs the cell measurement information periodically.

At step 1135, the UE determines whether one of the predetermined conditions for turning on the GNSS receiver is fulfilled. If none of the conditions for turning on the GNSS receiver is fulfilled, the procedure goes to step 1140.

At step 1140, if the GNSS receiver is used only for MDT, the UE stops the GNSS receiver or, if the GNSS receives is in the turn-off state, stays without any action. However, if the GNSS receiver is operating for other purpose, the UE has not to turn off the GNSS receiver.

If any condition for turning on the GNSS receiver is fulfilled, the UE turns on the GNSS receiver to acquire the location information at step 1145. The UE logs the location information along the MDT measurement information which is logged periodically at step 1150. At this time, if the UE turns on the GNSS receiver to acquire the location information for other purpose independently of the fulfillment of the conditions, the UE may log the location information along with the MDT measurement information.

At step 1155, the UE determines whether the logging duration has expired. If the logging duration has not expired, the UE monitors constantly whether it is in the interested area. If the logging duration has expired, the UE ends the logged MDT procedure.

Figure 12:
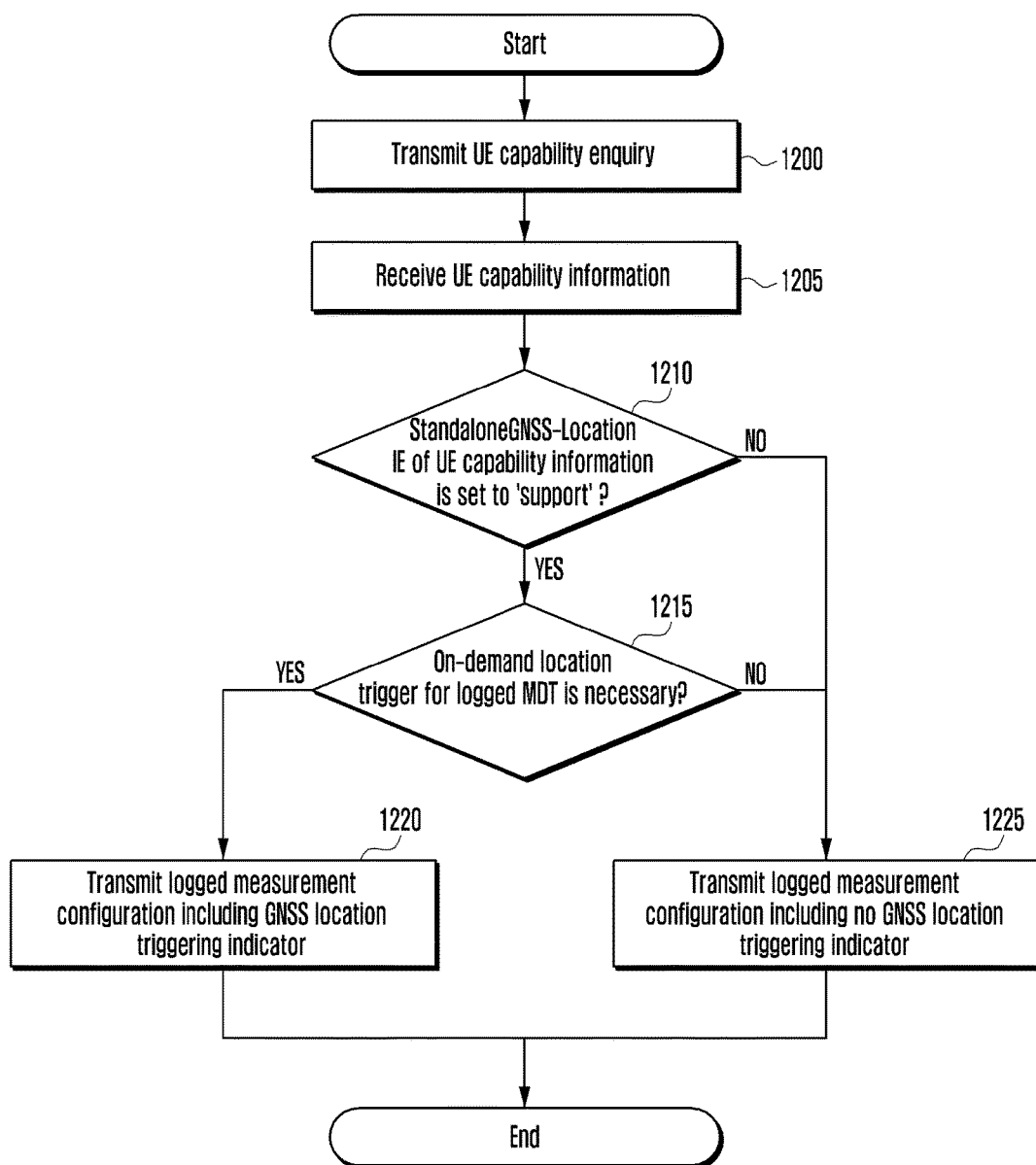
FIG. 12 is a flowchart illustrating the log configuration procedure of the eNB according to the second embodiment of the present invention.

FIG. 12 is a flowchart illustrating the log configuration procedure of the eNB according to the second embodiment of the present invention. The eNB sends the UE the UE capability enquiry message at step 1200. The eNB receives the UE capability information message from the UE at step 1205.

The eNB determines whether the standaloneGNSS-Location IE is set to 'support' in the capability information message at step 1210. If the IE is set to 'support', this means that the UE has the GNSS capable of acquiring GNSS location information. The standaloneGNSS-Location IE is an example, and the eNB is capable of analyzing the capability information message to check the positioning scheme supported by the UE based on other IE or indicator. Depending on the positioning scheme used by the UE, the logged measurement configuration which the eNB generates to the UE is determined differently.

If the UE does not support GNSS positioning, the eNB generates the logged MDT configuration requiring no GNSS location information to the UE at step 1225. If the UE supports the GNSS positioning, the eNB determines whether to configure the logged MDT requiring GNSS location information at step 1215. If it is determined to configure the logged MDT requiring GNSS location information, the eNB sends the UE the logged configuration message including the indicator requesting for the logged MDT requiring GNS location information.

Figure 13:
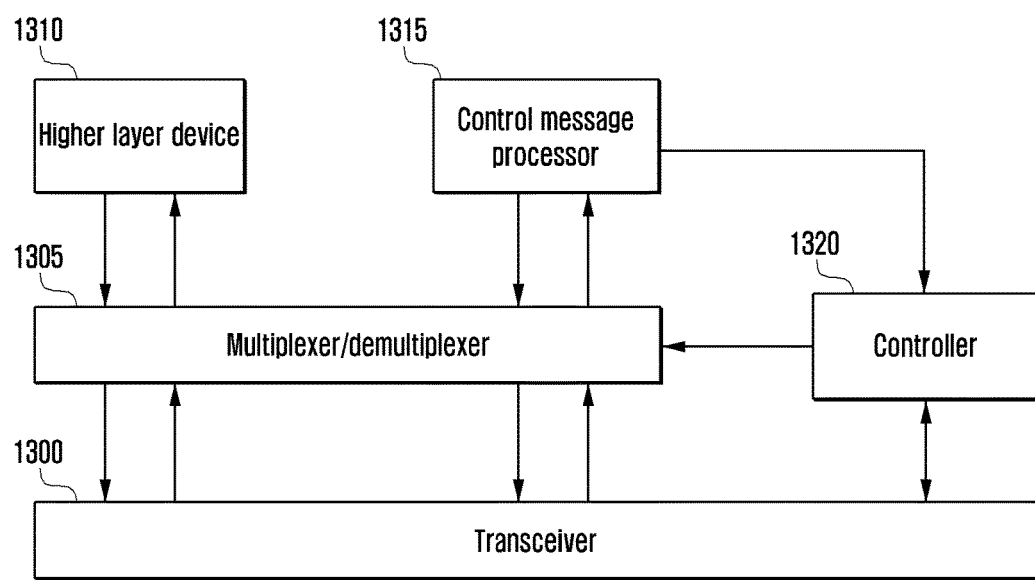
FIG. 13 is a block diagram illustrating a configuration of the UE according to embodiments of the present invention.

FIG. 13 is a block diagram illustrating a configuration of the UE according to embodiments of the present invention.

The UE communicates data with higher layer 1310 and transmits and received control messages through the control message processor 1315. The UE multiplexes the control signal and data signal to be transmitted to the eNB by means of the multiplexer 1305 and transmits the multiplexed data by means of the transmitter 1300 under the control of the controller 1305. In contrast, when receiving signals, the UE receives physical signal by means of the receiver 1300, demultiplexes the received signal by means of the demultiplexer 1305, and delivers the message informations to the higher layer 1310 or the control message processor 1315 under the control of the controller 1320. According to an embodiment of the present invention, the controller 1320 may control the individual components such that the UE operates as described above.

Figure 14:
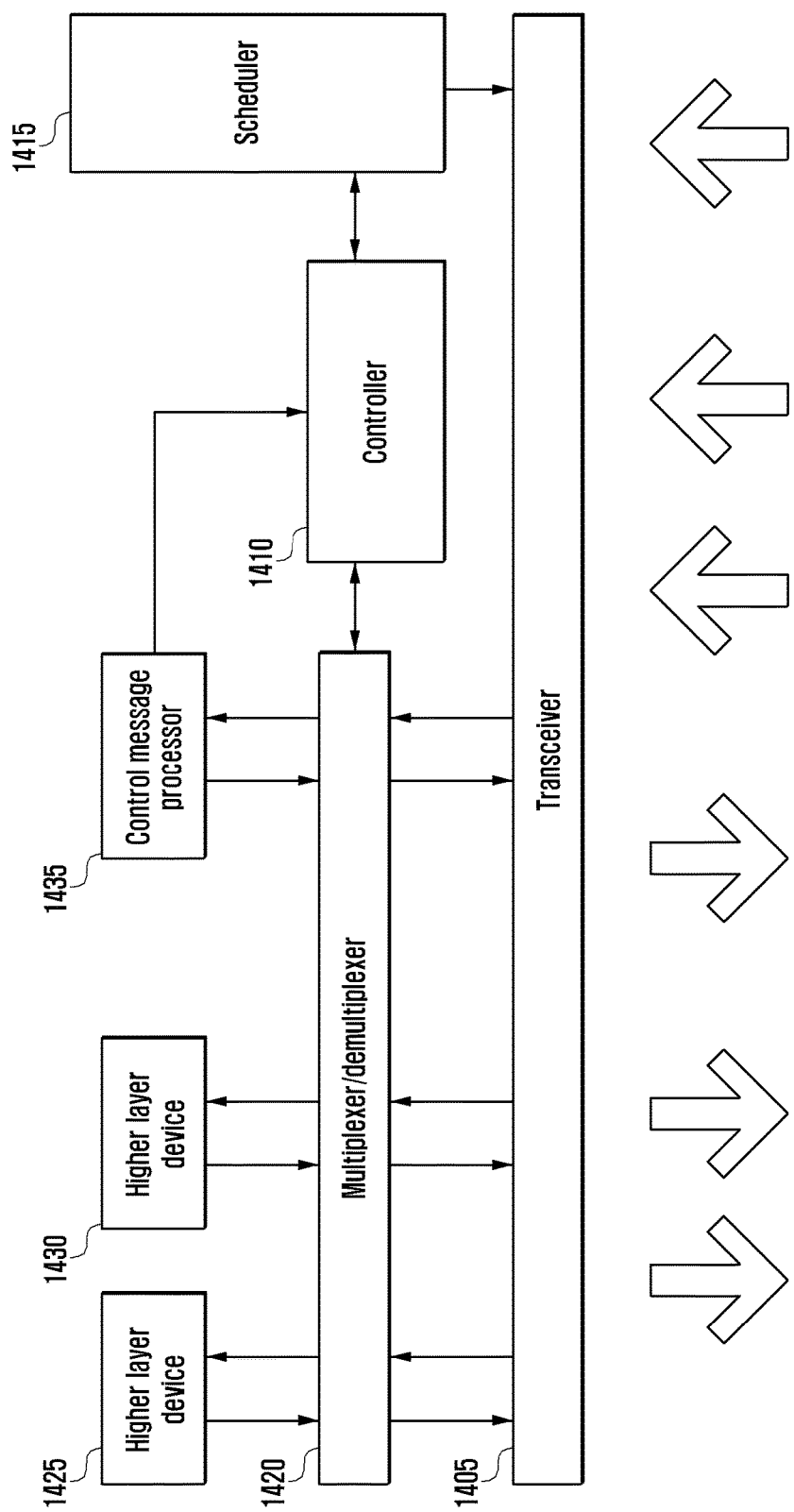
FIG. 14 is a block diagram illustrating a configuration of the eNB according to the embodiments of the present invention.

FIG. 14 is a block diagram illustrating a configuration of the eNB according to the embodiments of the present invention.

The eNB of FIG. 14 includes a transceiver 1405, a controller 1410, a multiplexer/demultiplexer 1420, a control message processor 1435, various higher layer processors 1425 and 1430, and a scheduler 1415. The transceiver 1405 transmits data and predetermined control signal on the downlink carrier and receives data and control signal on the uplink carrier. In the case that a plurality of carriers is configured, the transceiver 1405 is capable of transmitting and receiving data and control signals on the plural carriers. The multiplexer/demultiplexer 1420 multiplexes the data generated by the higher layer processors 1425 and 1430 and the control message processor 1435 or demultiplexes the data received by the transceiver 1405 to deliver the demultiplexed data to the higher layer processors 1425 and 1430, the control message processor 1435, and the controller 1410. The control unit 1401 determines whether to apply a band-specific measurement gap to a certain UE and whether to include the configuration information in the RRCConnectionReconfiguration message. The control message processor 1435 generates the RRCConnectionReconfiguration to the higher layer according to the instruction of the controller. The higher layer processors 1425 and 1430 may be implemented per UE per service and processes the data generated by the user service such as FTP and VoIP to deliver the processed data to the multiplexer/demultiplexer 1420 and processes the data from the multiplexer/demultiplexer 1420 to deliver the processed data to the higher layer service applications. The scheduler 1415 allocates transmission resource to the UE at appropriate timing in consideration of the buffer state, channel condition, and the active time of the UE and controls the transceiver to process the signal transmitted by the UE and transmit the signal to the UE. According to an embodiment of the present invention, the controller 1410 may control the respective components such that the eNB operates as described above.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Furthermore, the respective block diagrams may illustrate parts of modules, segments or codes including at least one or more executable instructions for performing specific logic function(s). Moreover, it should be noted that the functions of the blocks may be performed in different order in several modifications. For example, two successive blocks may be performed substantially at the same time, or may be performed in reverse order according to their functions.

The term "module" according to the embodiments of the invention, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

Although exemplary embodiments of the present invention have been described in detail hereinabove with specific terminology, this is for the purpose of describing particular embodiments only and not intended to be limiting of the invention. While particular embodiments of the present invention have been illustrated and described, it would be obvious to those skilled in the art that various other changes and modifications can be made without departing from the spirit and scope of the invention.

What is claimed is:

1. A method by a user equipment (UE) in a wireless communication system, the method comprising:
    transmitting at least one preamble for a random access;
    transmitting a first radio resource control (RRC) connection request message;
    starting a timer associated with an RRC connection setup;
    based on an expiry of the timer, setting first information indicating whether a maximum power level was used for a last transmitted preamble of the at least one transmitted preamble;
    transmitting a second RRC connection request message;
    transmitting an RRC connection setup complete message including second information indicating an availability of radio link failure related measurements in case that an RRC connection setup message is received; and
    transmitting a UE information response message including the first information in case that a UE information request message is received.

2. The method of claim 1, wherein the at least one preamble is transmitted by increasing a transmit power level step by step.

3. The method of claim 1, further comprising:
    based on the expiry of the timer, setting third information indicating a number of the at least one transmitted preamble.

4. The method of claim 3, further comprising, based on the expiry of the timer, at least one of:
    setting a cell identity of a cell;
    setting channel measurement information of the cell;
    setting channel measurement information of at least one neighbor cell; and
    setting a content of location information.

5. The method of claim 4, wherein the UE information response message further includes at least one of the third information indicating the number of the at least one transmitted preamble, the cell identity of the cell, the channel measurement information of the cell, the channel measurement information of the at least one neighbor cell, or the content of the location information.

6. A user equipment (UE) in a wireless communication system, the UE comprising:
    a transceiver; and
    a controller coupled with the transceiver and configured to:
        transmit at least one preamble for a random access,
        transmit a first radio resource control (RRC) connection request message,
        start a timer associated with an RRC connection setup,
        based on an expiry of the timer, set first information indicating whether a maximum power level was used for a last transmitted preamble of the at least one transmitted preamble,
        transmit a second RRC connection request message,
        transmit an RRC connection setup complete message including second information indicating an availability of radio link failure related measurements in case that an RRC connection setup message is received, and
        transmit a UE information response message including the first information in case that a UE information request message is received.

7. The UE of claim 6, wherein the controller is further configured to increase a transmit power level for the at least one preamble step by step.

8. The UE of claim 6, wherein the controller is further configured to, based on the expiry of the timer, set third information indicating a number of the at least one transmitted preamble.

9. The UE of claim 8, wherein the controller is further configured to, based on the expiry of the timer, perform at least one of:
    setting a cell identity of a cell;
    setting channel measurement information of the cell;
    setting channel measurement information of at least one neighbor cell; and
    setting a content of location information.

10. The UE of claim 9, wherein the UE information response message further includes at least one of the third information indicating the number of the at least one transmitted preamble, the cell identity of the cell, the channel measurement information of the cell, the channel measurement information of the at least one neighbor cell, or the content of the location information.

* * * * *